US012684103B2

(12) United States Patent
Matsuda et al.

(10) Patent No.: US 12,684,103 B2
(45) Date of Patent: Jul. 14, 2026

(54) REVERSE PASS-THROUGH GLASSES FOR AUGMENTED REALITY AND VIRTUAL REALITY DEVICES

(71) Applicant: Meta Platforms Technologies, LLC, Menlo Park, CA (US)

(72) Inventors: Nathan Matsuda, Seattle, WA (US); Brian Wheelwright, Sammamish, WA (US); Joel Hegland, Snohomish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/924,179

(22) Filed: Oct. 23, 2024

(65) Prior Publication Data

US 2025/0071253 A1 Feb. 27, 2025

Related U.S. Application Data

(60) Continuation of application No. 18/351,648, filed on Jul. 13, 2023, now Pat. No. 12,166,955, which is a
(Continued)

(51) Int. Cl.
H04N 13/322 (2018.01)
G02B 27/00 (2006.01)
(Continued)

(52) U.S. Cl.
CPC ....... H04N 13/322 (2018.05); G02B 27/0093 (2013.01); G06T 19/006 (2013.01); H04N 13/344 (2018.05); H04N 13/366 (2018.05)

(58) Field of Classification Search
CPC .. H04N 13/366; H04N 13/344; H04N 13/302; H04N 13/322; G06F 3/013; G06F 3/012; G02B 27/0093; G06T 19/006
See application file for complete search history.

(56) References Cited

U.S. PATENT DOCUMENTS 9,740,282 B1 8/2017 McInerny
10,650,573 B2 5/2020 Youngquist et al.
(Continued)

FOREIGN PATENT DOCUMENTS

CN 104811681 A 7/2015
CN 107995964 A 5/2018
(Continued)

OTHER PUBLICATIONS

Extended European Search Report for European Patent Application No. 25167159.0, dated Sep. 23, 2025, 11 pages.
(Continued)

*Primary Examiner* — Neil R Mikeska
(74) *Attorney, Agent, or Firm* — Potomac Law Group, PLLC; Dannon G. Allbee

(57) ABSTRACT

A device for providing a reverse pass-through view of a user of a headset display to an onlooker includes an eyepiece comprising an optical surface configured to provide an image to a user on a first side of the optical surface. The device also includes a first camera configured to collect an image of a portion of a face of the user reflected from the optical surface in a first field of view, a display adjacent to the optical surface and configured to project forward an image of the face of the user, and a screen configured to receive light from the display and provide the image of the face of the user to an onlooker.

20 Claims, 20 Drawing Sheets

Related U.S. Application Data division of application No. 17/396,449, filed on Aug. 6, 2021, now Pat. No. 11,736,679.

(60) Provisional application No. 63/142,458, filed on Jan. 27, 2021.

(51) Int. Cl.
| | | |
|---|---|---|
| *G06T 19/00* | (2011.01) | |
| *H04N 13/344* | (2018.01) | |
| *H04N 13/366* | (2018.01) | |

(56) References Cited

U.S. PATENT DOCUMENTS

| | | | |
|---|---|---|---|
| 10,719,939 | B2 | 7/2020 | Holzer et al. |
| 11,736,679 | B2 | 8/2023 | Matsuda et al. |
| 2015/0219897 | A1 | 8/2015 | Mukawa et al. |
| 2015/0253573 | A1 | 9/2015 | Sako et al. |
| 2015/0262424 | A1 | 9/2015 | Tabaka et al. |
| 2015/0338653 | A1 | 11/2015 | Subramaniam et al. |
| 2016/0018655 | A1 | 1/2016 | Imoto et al. |
| 2016/0217614 | A1 | 7/2016 | Kraver et al. |
| 2016/0217621 | A1 | 7/2016 | Raghoebardajal et al. |
| 2016/0255305 | A1 | 9/2016 | Ritchey et al. |
| 2016/0335475 | A1 | 11/2016 | Krenzer et al. |
| 2016/0337612 | A1 | 11/2016 | Im et al. |
| 2017/0115432 | A1 | 4/2017 | Schmidtlin |
| 2018/0004478 | A1 | 1/2018 | Chen |
| 2018/0252922 | A1 | 9/2018 | Fujimaki |
| 2018/0260187 | A1 | 9/2018 | Yasuda |
| 2019/0011703 | A1 | 1/2019 | Robaina et al. |
| 2019/0020869 | A1 | 1/2019 | Perreault et al. |
| 2019/0244362 | A1 | 8/2019 | Movshovitz-Attias et al. |
| 2019/0286406 | A1 | 9/2019 | Chen |
| 2020/0026079 | A1 | 1/2020 | Franklin et al. |
| 2020/0265618 | A1 | 8/2020 | Chen et al. |
| 2020/0296327 | A1 | 9/2020 | Karafin et al. |
| 2020/0368616 | A1 | 11/2020 | Delamont |
| 2020/0372625 | A1 | 11/2020 | Dal Mutto et al. |
| 2021/0260485 | A1 | 8/2021 | Elbert et al. |
| 2022/0201273 | A1 | 6/2022 | Matsuda et al. |
| 2022/0239893 | A1 | 7/2022 | Matsuda et al. |

FOREIGN PATENT DOCUMENTS

| | | | |
|---|---|---|---|
| CN | 108780504 | A | 11/2018 |
| CN | 109643017 | A | 4/2019 |
| CN | 110536726 | A | 12/2019 |
| CN | 111033524 | A | 4/2020 |
| CN | 111727385 | A | 9/2020 |
| CN | 116762032 | A | 9/2023 |
| JP | 2015521298 | A | 7/2015 |
| JP | 2016109760 | A | 6/2016 |
| JP | 2017069687 | A | 4/2017 |
| JP | 2018142857 | A | 9/2018 |
| JP | 2019068932 | A | 5/2019 |
| JP | 2020514811 | A | 5/2020 |
| JP | 2020527872 | A | 9/2020 |
| KR | 20200003890 | A | 1/2020 |
| TW | 201907204 | A | 2/2019 |
| WO | 2014041871 | A1 | 3/2014 |
| WO | 2014156388 | A1 | 10/2014 |
| WO | 2018005331 | A1 | 1/2018 |
| WO | 2020210086 | A1 | 10/2020 |

OTHER PUBLICATIONS

Mai C., et al., "TransparentHMD: Revealing the HMD User's Fae to Bystanders," Proceedings of the 16th International Conference on Mobile and Ubiquitous Multimedia, Nov. 26, 2017, pp. 515-520, Retrieved from the Internet URL: https://eprints.gla.ac.uk/170217/1/170217.pdf.

Office Action mailed Sep. 9, 2025 for Japanese Patent Application No. 2023-538972, filed on Jun. 23, 2023, 3 pages.

Office Action mailed Jun. 18, 2025 for Taiwan Application No. 110148342, filed Dec. 23, 2021, 7 pages.

Office Action mailed Aug. 26, 2025 for Taiwan Application No. 110148342, filed Dec. 23, 2021, 3 pages.

Office Action mailed Jul. 29, 2025 for Japanese Patent Application No. 2023-538974, filed on Dec. 21, 2021, 3 pages.

Office Action mailed May 13, 2025 for Taiwan Application No. 110144437, filed Nov. 29, 2021, 6 pages.

Abdal R., et al., "Image2StyleGAN: How to Embed Images into the StyleGAN Latent Space?," In Proceedings of the IEEE International Conference on Computer Vision, Oct. 27-Nov. 2, 2019, pp. 4432-4441.

Alexander O., et al., "The Digital Emily Project: Photoreal Facial Modeling and Animation," In ACM SIGGRAPH 2009 Course, 15 pages.

Anstis S.M., et al., The Perception of Where a Face or Television Portrait is Looking, The American Journal of Psychology, Dec. 1969, vol. 82, No. 4, pp. 474-489.

Bermano A.H., et al., "Makeup Lamps: Live Augmentation of Human Faces via Projection," In Computer Graphics Forum, Wiley Online Library, 2017, vol. 36, No. 2, pp. 311-323.

Blender Online Community, "Blender—A 3D Modelling and Rendering Package," Blender Foundation, Stichting Blender Foundation, Amsterdam, 2021, Retrieved from Internet: URL: http://www.blender.org.

Burgos-Artizzu X., et al., "Real-Time Expression-Sensitive HMO Face Reconstruction," Nov. 2, 2015, 4 pages.

Chan L., et al., FrontFace: Facilitating Communication between HMD Users and Outsiders using Front-Facing-Screen HMDs, In Proceedings of the 19th International Conference on Human-Computer Interaction with Mobile Devices and Services, Sep. 2017, pp. 1-5.

Chen M., Leveraging the Asymmetric Sensitivity of Eye Contact for Videoconference, In Proceedings of the SIGCHI Conference on Human factors in Computing Systems, Apr. 2002, vol. 4, No. 1, pp. 49-56.

Chen W., et al., Learning to Predict 3D Objects with an Interpolation-Based Differentiable Renderer, in Advances in Neural Information Processing Systems, 2019, pp. 9609-9619.

Cootes T.F., et al., "Active Appearance Models," In IEEE Transactions on Pattern Analysis and Machine Intelligence, Springer, 1998, pp. 484-498.

Corrected Notice of Allowability mailed Dec. 28, 2022 for U.S. Appl. No. 17/396,449, filed Aug. 6, 2021, 5 pages.

Frueh C., et al., "Headset removal for virtual and mixed reality," ACMSIGGRAPH Talks, 2017,2 pages.

Furukawa T., et al., "TeleSight: Enabling Asymmetric Collaboration in VR between HMD User and Non-HMD Users," In ACM SIGGRAPH 2019 Emerging Technologies, 2019, pp. 1-2.

Geng Y., et al., Viewing Optics for Immersive Near-Eye Displays: Pupil Swim/Size and Weight/Stray Light, in Digital Optics for Immersive Displays, International Society for Optics and Photonics, 2018, vol. 10676, 18 pages.

Gotsch D., et al., "TeleHuman2: A Cylindrical Light Field Teleconferencing System for Life-size 3D Human Telepresence," Conference on Human Factors in Computing Systems, Apr. 21-26, 2018, 18:552, 10 pages.

Gugenheimer J., et al., "FaceDisplay: Towards Asymmetric Multi-User Interaction for Nomadic Virtual Reality," In Proceedings of the 2018 CHI Conference on Human Factors in Computing Systems, Apr. 2018, pp. 1-13.

Henzler P., et al., "Escaping Plato's Cave: 3D Shape from Adversarial Rendering," In Proceedings of the IEEE International Conference on Computer Vision, 2019, pp. 9984-9993.

International Preliminary Report on Patentability for International Application No. PCT/US2021/065054, mailed Jul. 6, 2023, 7 pages.

International Preliminary Report on Patentability for International Application No. PCT/US2022/013128, mailed Aug. 10, 2023, 8 pages.

(56)         References Cited

OTHER PUBLICATIONS

International Search report and Written Opinion for International Application No. PCT/US2021/064690, mailed Jun. 20, 2022, 15 pages.
International Search Report and Written Opinion for International Application No. PCT/US2021/065054, mailed Jul. 12, 2022, 8 pages.
International Search Report and Written Opinion for International Application No. PCT/US2022/013128, mailed Jul. 27, 2022, 9 pages.
Jones A., et al., Achieving Eye Contact in a One-To-Many 3D Video Teleconferencing System, ACM Transactions on Graphics (TOG), Aug. 2009, vol. 28, No. 3, Article 64, pp. 1-8.
Kanazawa A., et al., "Learning Category-Specific Mesh Reconstruction from Image Collections," In Proceedings of the European Conference on Computer Vision (ECCV), 2018, pp. 371-386.
Karimzadeh A., "Analysis of the Depth of Field in Hexagonal Array Integral Imaging Systems Based on Modulation Transfer Function and Strehl Ratio," Applied Optics, 2016, vol. 55, No. 11, pp. 3045-3050.
Karras T., et al., "A Style-Based Generator Architecture for Generative Adversarial Networks," In IEEE Conference on Computer Vision and Pattern Recognition (CVPR), Jun. 16-20, 2019, pp. 4401-4410.
Kato H., et al., "Neural 3D Mesh Renderer," In Proceedings of the IEEE Conference on Computer Vision and Pattern Recognition (CVPR), 2018, pp. 3907-3916.
Kim K., "TeleHuman: Effects of 3D Perspective on Gaze and Pose Estimation with a Life-Size Cylindrical Telepresence Pod," In Proceedings of the SIGCHI Conference on Human Factors in Computing Systems, May 2012, pp. 2531-2540.
Lanman D., et al., "Depth of Field Analysis for Multilayer Automultiscopic Displays," In Journal of Physics: Conference Series, IOP Publishing, 2013, vol. 415, No. 012036, 9 pages.
Li H., et al., "Facial Performance Sensing Head-Mounted Display," ACM Transactions on Graphics (ToG), Aug. 2015, vol. 34, No. 4, Article 47, pp. 1-9.
Lincoln P., et al., "Animatronic Shader Lamps Avatars," In 2009 8th IEEE International Symposium on Mixed and Augmented Reality, Oct. 2009, pp. 27-33.
Lincoln P., et al., "Multi-View Lenticular Display for Group Teleconferencing," In Proceedings of the 2nd International Conference on Immersive Telecommunications, 2009, pp. 1-8.
Liu L., et al., "Neural Sparse Voxel Fields," Neural Information Processing Systems (NeurIPS), Dec. 6-12, 2020, 20 pages.
Liu S., et al., "Soft Rasterizer: A Differentiable Renderer for Image-Based 3D Reasoning," In Proceedings of the IEEE International Conference on Computer Vision, 2019, pp. 7708-7717.
Lombardi S., et al., "Neural Volumes: Learning Dynamic Renderable vols. from Images," ACM Transactions Graph, Jun. 18, 2019, vol. 38 (4), Article 65, pp. 1-14, XP081383263.
Mai C., et al., Frontal Screens on Head-Mounted Displays to Increase Awareness of the HMD Users State in Mixed Presence Collaboration, arXiv preprint arXiv: 1905.06102, 2019, 10 pages.
Maimone A., et al., "Holographic Optics for Thin and Lightweight Virtual Reality," Facebook Reality Labs, ACM Trans. Graph. Article 67, vol. 39, No. 4, Jul. 2020, 14 pages.
Martin-Brualla R., et al., NeRF in the Wild: Neural Radiance Fields for Unconstrained Photo Collections, Computer Vision and Pattern Recognition (CVPR), Jun. 2020, arXiv: 2008.02268v2 [cs.CV], 14 Pages.
Mayer N., et al., A Large Dataset to Train Convolutional Networks for Disparity, Optical Flow, and Scene Flow Estimation, Computer Vision and Pattern Recognition (CVPR), 2016, pp. 4040-4048.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis," European Conference on Computer Vision (ECCV), Aug. 3, 2020,25 pages.

Misawa K., et al., ChameleonMask: Embodied Physical and Social Telepresence Using Human Surrogates, in Proceedings of the 33rd Annual ACM Conference Extended Abstracts on Human Factors in Computing Systems, Apr. 2015, pp. 401-411.
Morishima, S., et al., "Hypermask: Talking Head Projected onto Real Object," The Visual Computer, 2002, vol. 18, pp. 111-120, DOI: https://doi.org/10.1007/s003710100140.
Moubayed S.A., et al., "Furhat: A Back-Projected Human-Like Robot Head for Multiparty Human-Machine Interaction," In Cognitive Behavioural Systems, 2012, vol. 7403, pp. 114-130.
Moubayed S.A., et al., Taming Mona Lisa: Communicating Gaze Faithfully in 2D and 3D Facial Projections, ACM Transactions on Interactive Intelligent Systems (TiiS), Jan. 2012, vol. 1, No. 2, Article 11, pp. 1-25.
Nagano K., et al., An Autostereoscopic Projector Array Optimized for 3D Facial Display, in ACM SIGGRAPH 2013 Emerging Technologies, 2013,1 page.
Nguyen-Phuoc T., et al., HoloGAN: Unsupervised Learning of 3D Representations from Natural Images, in Proceedings of the IEEE International Conference on Computer Vision, 2019, pp. 7588-7597.
Nguyen-Phuoc T., et al., "RenderNet: A Deep Convolutional Network for Differentiable Rendering from 3D Shapes," In Advances in Neural Information Processing Systems (NeurIPS), 2018, pp. 1-11.
Non-Final Office Action mailed Oct. 25, 2023 for U.S. Appl. No. 17/556,367, filed Dec. 20, 2021, 19 pages.
Notice of Allowance mailed Nov. 17, 2022 for U.S. Appl. No. 17/396,449, filed Aug. 6, 2021, 9 pages.
Notice of Allowance mailed Jun. 25, 2024 for U.S. Appl. No. 17/556,367, filed Dec. 20, 2021, 23 pages.
Oechsle M., et al., "Texture Fields: Learning Texture Representations in Function Space," International Conference on Computer Vision (ICCV), 2019, pp. 4531-4540.
Office Action mailed Feb. 1, 2024 for European Patent Application No. 22703511.0, filed on Jan. 20, 2022, 11 pages.
Office Action mailed Jan. 14, 2025 for European Patent Application No. 22703511.0, filed on Jan. 20, 2022, 13 pages.
Olszewski K., et al., "Transformable Bottleneck Networks," In Proceedings of the IEEE International Conference on Computer Vision, 2019, pp. 7648-7657.
Pan Y., et al., "A Gaze-Preserving Situated Multiview Telepresence System," In Proceedings of the SIGCHI Conference on Human Factors in Computing Systems, 2014, pp. 2173-2176.
Pan Y., et al., "Comparing Flat and Spherical Displays in a Trust Scenario in Avatar-Mediated Interaction," In Proceedings of the SIGCHI Conference on Human Factors in Computing Systems, 2014, pp. 1397-1406.
Pan Y., et al., "Effects of 3D Perspective on Head Gaze Estimation with a Multiview Autostereoscopic Display," International Journal of Human-Computer Studies, 2016, vol. 86, pp. 138-148.
Saito S., et al., "PIFu: Pixel-Aligned Implicit Function for High-Resolution Clothed Human Digitization," International Conference on Computer Vision (ICCV), Oct. 2019, pp. 2304-2314.
Saito S, et al., "PIFuHD: Multi-Level Pixel-Aligned Implicit Function for High-Resolution 3D Human Digitization," in Proceedings of the IEEE Conference on Computer Vision and Pattern Recognition (CVPR), Apr. 1, 2020, pp. 84-93.
Schubert R., et al., "Advances in Shader Lamps Avatars for Telepresence," In 2012 3DTVConference: The True Vision-Capture, Transmission and Display of 3D Video (3DTVCON), IEEE, 2012, 4 pages.
Schwarz K., et al., "GRAF: Generative Radiance Fields for 3D-Aware Image Synthesis," Advances in Neural Information Processing Systems (NeurIPS), Dec. 6-12, 2020, vol. 33, 13 pages.
Sirkin D., et al., Motion and Attention in a Kinetic Videoconferencing Proxy, in IFIP Conference on Human-Computer Interaction, Springer, 2011, 19 pages.
Sitzmann V., et al., "Scene Representation Networks: Continuous 3D Structure-Aware Neural SceneRepresentations," In Advances in Neural Information Processing Systems, Dec. 8-14, 2019, pp. 1121-1132.

(56) References Cited

OTHER PUBLICATIONS

Sitzmann V., et al., "Deepvoxels: Learning Persistent 3d Feature Embeddings," Proceedings of the IEEE!CVF Conference on Computer Vision and Pattern Recognition, Jun. 15-20, 2019, pp. 2437-2446.

Tewari A., et al., State of the Art on Neural Rendering, State of The Art Report (STAR), May 2020, vol. 39, No. 2, 27 pages.

Tewari A., et al., StyleRig: Rigging StyleGAN for 3D Control over Portrait Images, in Proceedings of the IEEE/CVF Conference on Computer Vision and Pattern Recognition, 2020, pp. 6142-6151.

Thies J., et al., FaceVR: Real-Time Gaze-Aware Facial Reenactment in Virtual Reality, ACM Transactions on Graphics (TOG), Jun. 2018, vol. 37, No. 2, Article 25, pp. 1-15.

Todorovic D., Geometrical Basis of Perception of Gaze Direction, Vision research, 2006, vol. 46, pp. 3549-3562.

Viazovetskyi Y., et al., "StyleGAN2 Distillation for Feed-Forward Image Manipulation," arXiv preprint arXiv:2003.03581, 2020, 18 pages.

Wang C., et al., "HMD Light: Sharing In-VR Experience via Head-Mounted Projector for asymmetric Interaction," In Proceedings of the 33rd Annual ACM Symposium on User Interface Software and Technology, Oct. 2020, pp. 472-486.

Wang M., et al., "Faithful Face Image Completion for HMD Occlusion Removal," In 2019 IEEE International Symposium on Mixed and Augmented Reality Adjunct (ISMAR-Adjunct), 2019, pp. 251-256.

Wang Y., et al., "Anytime Stereo Image Depth Estimation on Mobile Devices," In 2019 International Conference on Robotics and Automation (ICRA), May 2019, pp. 5893-5900.

Wetzstein G., et al., "Computational Schlieren Photography with Light Field Probes," International Journal of Computer Vision, 2014, 15 pages.

Wollaston W.H., "XIII. On the Apparent Direction of Eyes in a Portrait," Philosophical Transactions of the Royal Society of London, 1824, vol. 114, pp. 247-256.

Wong T.L., et al., "Folded Optics with Birefringent Reflective Polarizers," In Digital Optical Technologies, International Society for Optics and Photonics, 2017, vol. 10335, Article 103350E, pp. 1-7.

Wyman C., "Interactive Image-Space Refraction of Nearby Geometry," In Proceedings of the 3rd International Conference on Computer Graphics and Interactive Techniques in Australasia and South East Asia, 2005, pp. 205-211.

Yariv L., et al., "Multiview Neural Surface Reconstruction by Disentangling Geometry and Appearance," Neural Information Processing Systems (NeurIPS), Dec. 6-12, 2020, 11 pages.

Zhang R., et al., "The Unreasonable Effectiveness of Deep Features as a Perceptual Metric," In Proceedings of the IEEE Conference on Computer Vision and Pattern Recognition, Jun. 2018, 10 pages.

Zhu J., et al., Visual Object Networks: Image Generation with Disentangled 3D Representations, in Advances in Neural Information Processing Systems, 2018, pp. 118-129.

Zhu J-Y., et al., "Unpaired Image-to-Image Translation using Cycle-Consistent Adversarial Networks," IEEE International Conference on Computer Vision (ICCV), 2017, pp. 2223-2232.

Office Action mailed Dec. 3, 2025 for European Patent Application No. 22703511.0, filed on Jan. 20, 2022, 15 pages.

Office Action mailed Nov. 12, 2025 forTaiwan Application No. 110148213, filed Dec. 22, 2021,21 pages.

Office Action mailed Jan. 2, 2026 for Korean Application No. 10-2023-7024223, filed Jul. 14, 2023, 18 pages.

Office Action mailed Feb. 11, 2026 for Chinese Application No. 202280012183.1, filed 20 Janaury 2022, 13 pages.

Office Action mailed Dec. 23, 2025 for Japanese Patent Application No. 2023-538972, filed on Jun. 23, 2023, 4 pages.

Tompkin J., et al., "Joint 5D Pen Input for Light Field Displays," ACM Digital Library, Nov. 5, 2015, 12 Pages.

Office Action mailed Apr. 15, 2026 for Chinese Application No. 202180094430.2, filed Dec. 21, 2021, 3 pages.

Office Action mailed May 1, 2026 for Chinese Application No. 202180094429.X, filed Dec. 23, 2021, 8 pages.

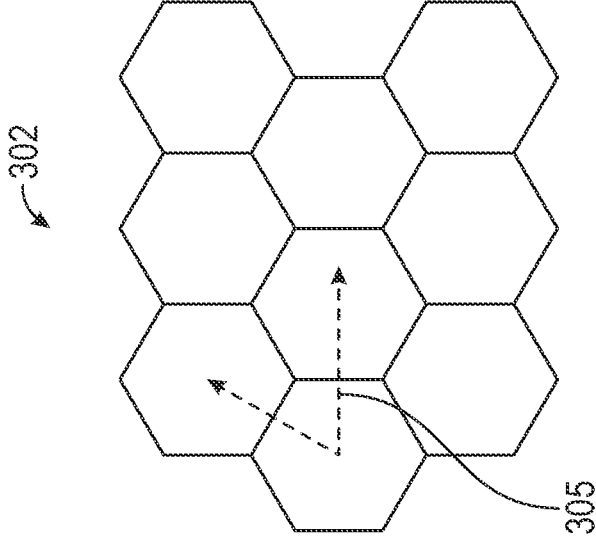
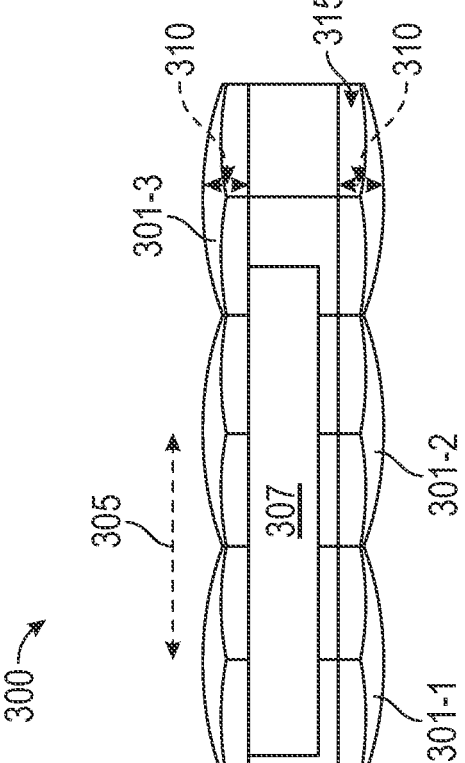
FIG. 3A

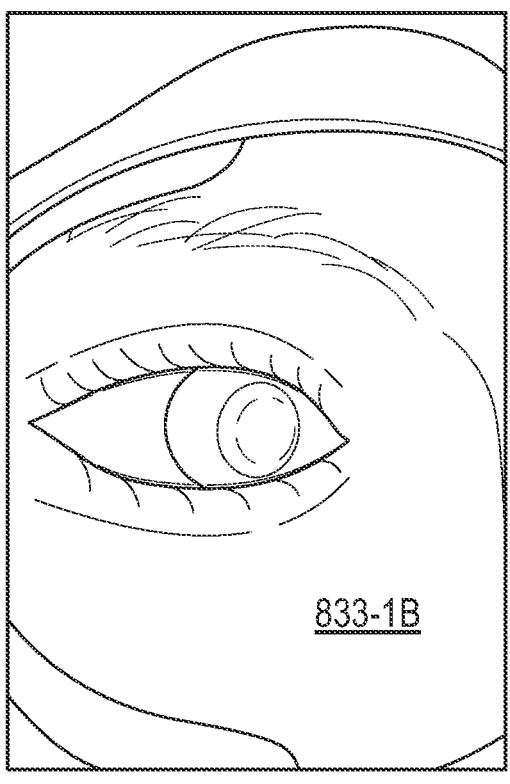
833-1B
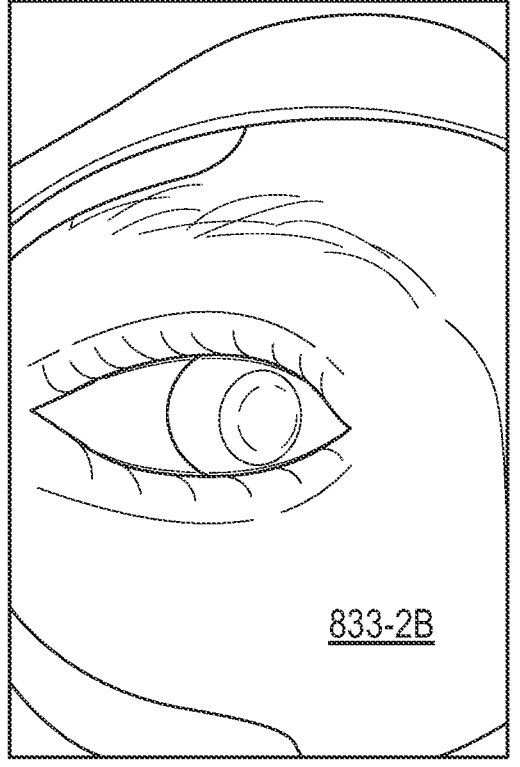
833-2B
FIG. 8B

833C

800

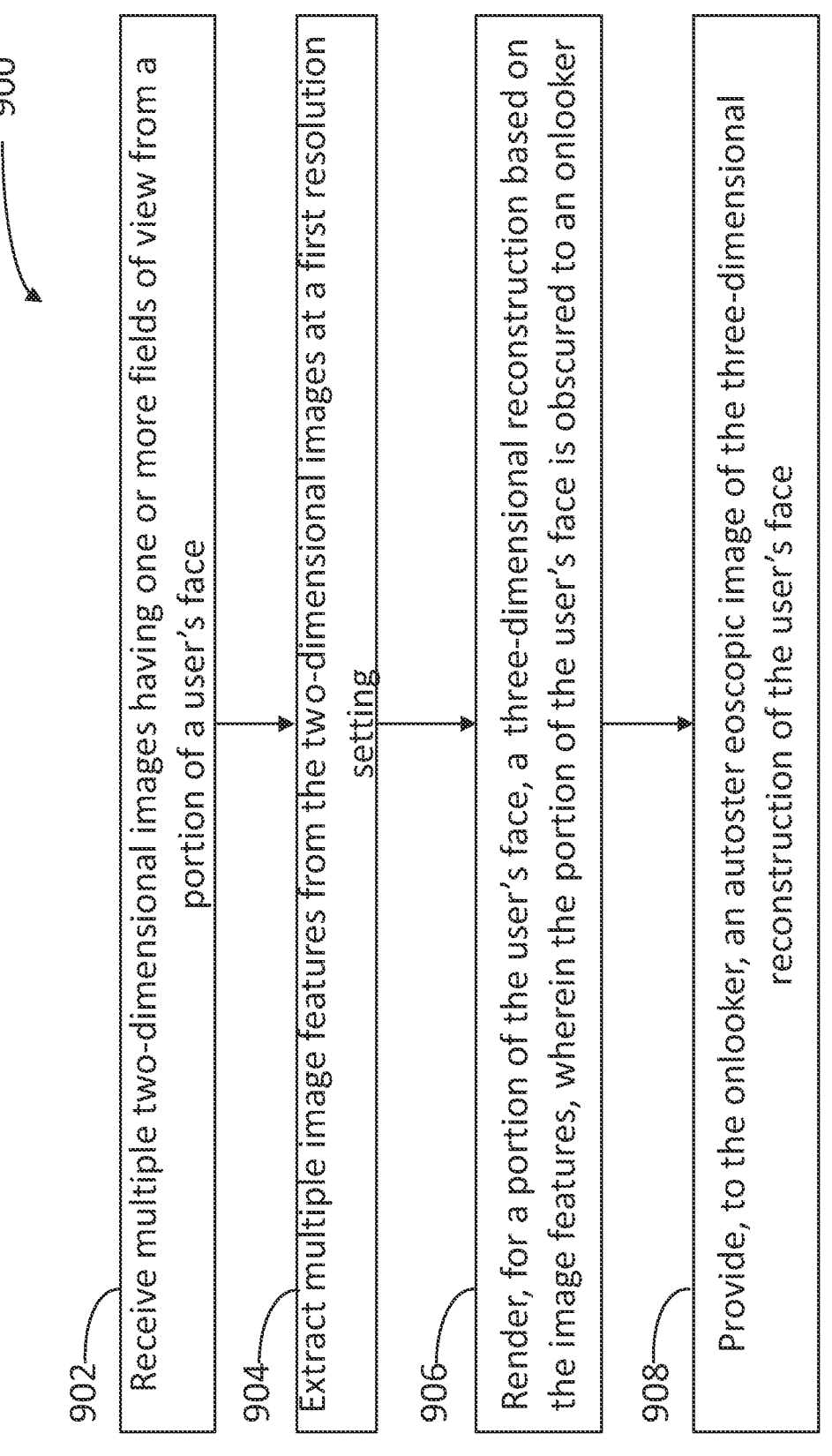

900

902 — Receive multiple two-dimensional images having one or more fields of view from a portion of a user's face 904 — Extract multiple image features from the two-dimensional images at a first resolution setting 906 — Render, for a portion of the user's face, a three-dimensional reconstruction based on the image features, wherein the portion of the user's face is obscured to an onlooker 908 — Provide, to the onlooker, an autostereoscopic image of the three-dimensional reconstruction of the user's face

FIG. 9

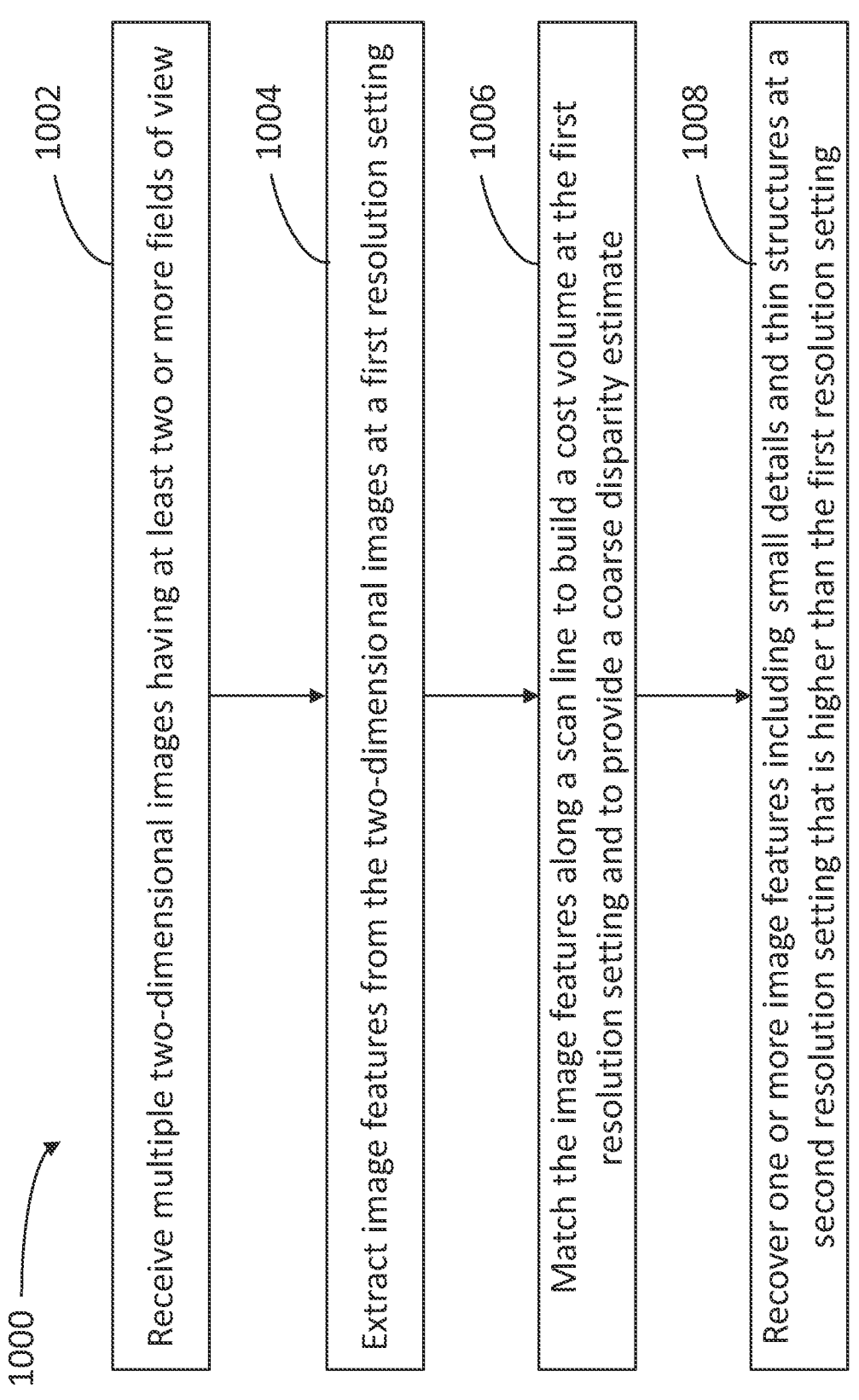

1000

1002 Receive multiple two-dimensional images having at least two or more fields of view 1004 Extract image features from the two-dimensional images at a first resolution setting 1006 Match the image features along a scan line to build a cost volume at the first resolution setting and to provide a coarse disparity estimate 1008 Recover one or more image features including small details and thin structures at a second resolution setting that is higher than the first resolution setting

FIG. 10

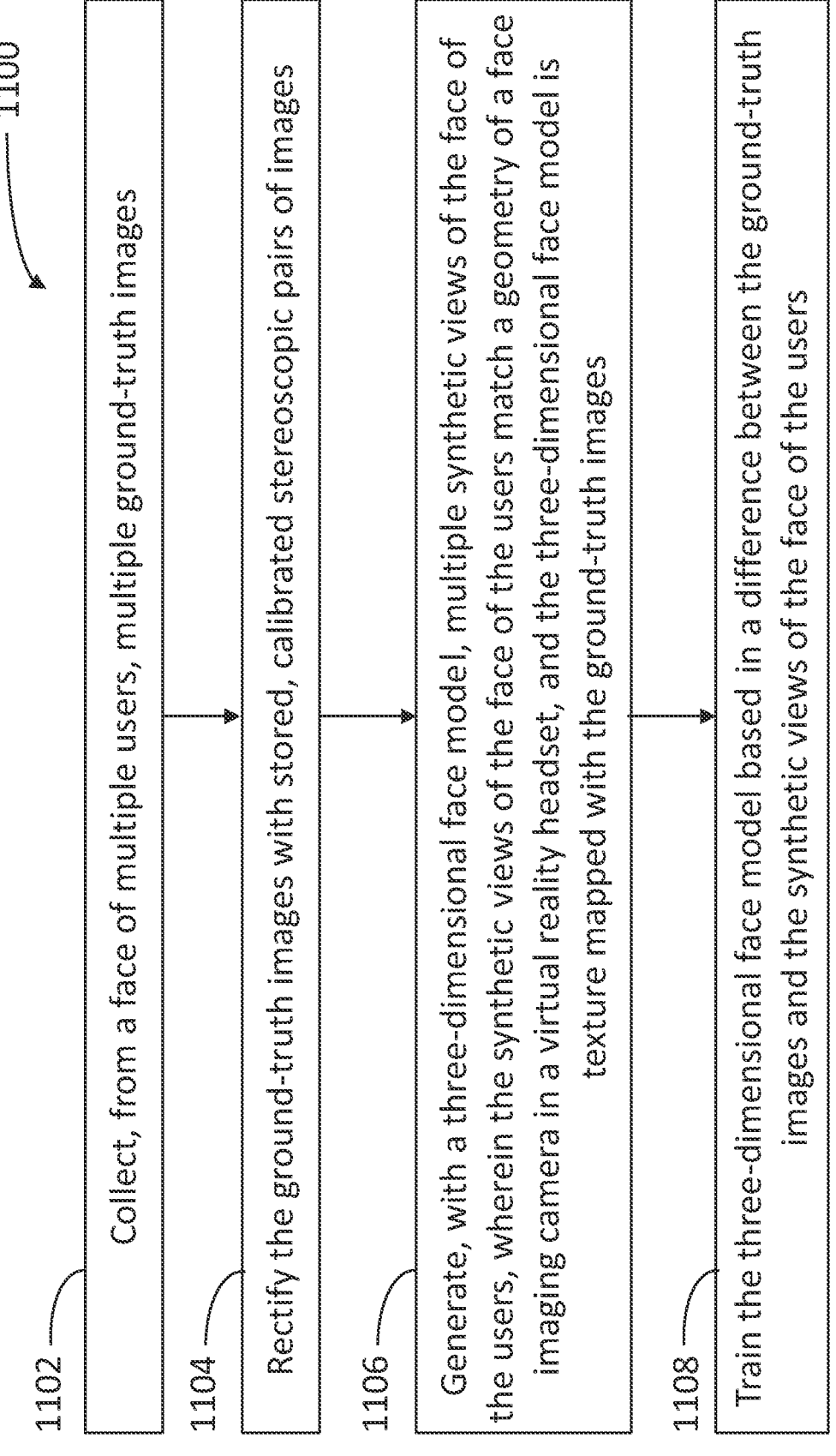

1100

1102 — Collect, from a face of multiple users, multiple ground-truth images

1104 — Rectify the ground-truth images with stored, calibrated stereoscopic pairs of images 1106 — Generate, with a three-dimensional face model, multiple synthetic views of the face of the users, wherein the synthetic views of the face of the users match a geometry of a face imaging camera in a virtual reality headset, and the three-dimensional face model is texture mapped with the ground-truth images 1108 — Train the three-dimensional face model based in a difference between the ground-truth images and the synthetic views of the face of the users

FIG. 11

REVERSE PASS-THROUGH GLASSES FOR AUGMENTED REALITY AND VIRTUAL REALITY DEVICES

CROSS-REFERENCE TO RELATED APPLICATIONS

This application claims priority under 35 U.S.C. § 120 as a continuation of U.S. patent application Ser. No. 18/351, 648, filed Jul. 13, 2023, which is a divisional of U.S. patent application Ser. No. 17/396,449, filed Aug. 6, 2021, which claims the benefit of U.S. Provisional Application No. 63/142,458, filed on Jan. 27, 2021, the contents of which are hereby incorporated by reference in their entirety, for all purposes.

BACKGROUND

Technical Field

The present disclosure is related to augmented reality (AR) and virtual reality (VR) devices including a reverse pass-through feature that provides a realistic view of a user's facial features to a forward onlooker. More specifically, the present disclosure provides an autostereoscopic extremal display for onlookers of an AR/VR headset user.

Related Art

In the field of AR and VR devices, some devices include outward facing displays that provide a view for an onlooker of the images being displayed for the user of the device. While these configurations facilitate a better understanding for an onlooker of what a user of the AR or VR device is experiencing, it leaves the onlooker clueless as to what is the state of mind of the user or focus of attention of the user, such as if the user is attempting to speak to the onlooker using a pass-through mode and is not otherwise engaged in a virtual reality environment. Moreover, for such devices having outward facing displays, they are typically traditional, two-dimensional displays lacking the realistic view of a full bodied image of at least a portion of the user's face or head, such as to portray the accurate depth and distance of the user's face or head within the device.

BRIEF DESCRIPTION OF THE FIGURES

FIGS. 3A-3D illustrate different aspects and components of a micro lens array used to provide a reverse pass-through view of an AR or a VR device user to a forward onlooker, according to some embodiments.

FIGS. 8A-8D illustrate elements and steps in a method for training a model to provide a view of a portion of a user's face to an auto stereoscopic display in a virtual reality headset, according to some embodiments.

FIG. 9 illustrates a flowchart in a method for providing an autostereoscopic view of a face of a VR/AR headset user, according to some embodiments.

FIG. 10 illustrates a flowchart in a method for rendering a three-dimensional (3D) view of a portion of a user's face from multiple, two-dimensional (2D) images of a portion of the user's face.

FIG. 11 illustrates a flowchart in a method for training a model to render a three-dimensional (3D) view of a portion of a user's face from multiple, two-dimensional (2D) images of a portion of the user's face, according to some embodiments.

In the figures, like elements are labeled likewise, according to their description, unless explicitly stated otherwise.

SUMMARY

Figure 1A:
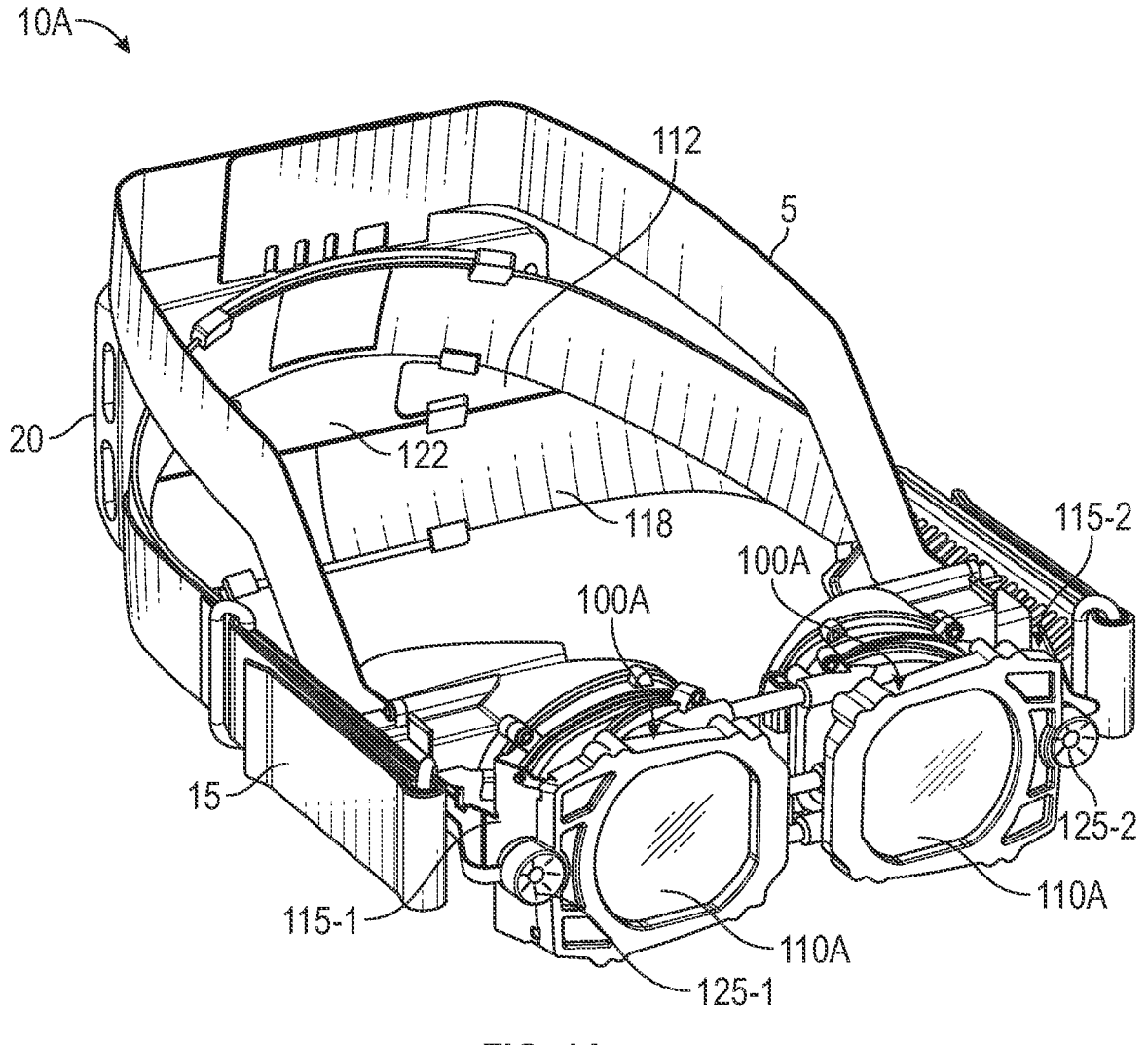
FIG. 1A illustrates an AR or VR device including an autostereoscopic extremal display, according to some embodiments.

In a first embodiment, a device includes a near-eye display configured to provide an image to a user and an eye imaging system configured to collect an image of a face of the user. The device also includes a light field display configured to provide an autostereoscopic image of a three-dimensional reconstruction of the face of the user to an onlooker. The autostereoscopic image depicts a perspective-corrected view of the user's face from multiple viewpoints within a field of view of the light field display.

In a second embodiment, a computer-implemented method includes receiving multiple two-dimensional images having one or more fields of view from a portion of a user's face and extracting multiple image features from the two-dimensional images at a first resolution setting. The computer-implemented method also includes rendering, for a portion of the user's face, a three-dimensional reconstruction based on the image features, wherein the portion of the user's face is obscured to an onlooker, and providing, to the onlooker, an autostereoscopic image of the three-dimensional reconstruction of the user's face.

In a third embodiment, a computer-implemented method is used for training a model to provide a view of a portion of a user's face to an auto stereoscopic display in a virtual reality headset. The computer-implemented method includes collecting, from a face of multiple users, multiple ground-truth images and rectifying the ground-truth images with stored, calibrated stereoscopic pairs of images. The computer-implemented method also includes generating, with a three-dimensional face model, multiple synthetic views of the face of the users, wherein the synthetic views of the face of the users match a geometry of a face imaging camera in the virtual reality headset, and the three-dimensional face model is texture mapped with the ground-truth images. The computer-implemented method also includes training the three-dimensional face model based on a difference between the ground-truth images and the synthetic views of the face of the users.

In yet another embodiment, a system includes a first means for storing instructions and a second means for executing the instructions to perform a method, the method includes collecting, from a face of multiple users, multiple ground-truth images and rectifying the ground-truth images with stored, calibrated stereoscopic pairs of images. The method also includes generating, with a three-dimensional face model, multiple synthetic views of the face of the users, wherein the synthetic views of the face of the users match a geometry of a face imaging camera in the virtual reality headset, and the three-dimensional face model is texture mapped with the ground-truth images. The method also includes training the three-dimensional face model based on a difference between the ground-truth images and the synthetic views of the face of the users.

DETAILED DESCRIPTION OF THE FIGURES

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

In the field of AR and VR devices and uses thereof, there exists a disconnection between the user and the environment that may be annoying to people surrounding the user, if not hazardous for the user and others nearby. In some scenarios, it may be desirable for the user to engage one or more onlookers for conversation, or attention. Current AR and VR devices lack the ability for onlookers to engage and to verify the focus of attention of the user.

Typically, display applications trying to match a wide-angle field of view or three-dimensional displays with a deep focal distance need to compromise on spatial resolution of the display. One approach is to reduce the size of the pixels in the display to increase the resolution; however, the pixel size in current state-of-the-art technology is reaching the diffraction limit of visible and near infrared light, which imposes a limit to the ultimate resolution that can be achieved. In the case of AR and VR devices, this compromise between spatial resolution and angular resolution is less constringent, given the limited ranges associated with the form factor and angular dimensions involved in these devices.

A desirable feature of an AR/VR device is to have a small form factor. Accordingly, thinner devices are desirable. To achieve this, multi-lensed array (MLA) light field displays, having a shorter working distance, provide a thin cross section of a VR headset with limited resolution loss by using convenient designs of holographic pancake lenses.

Another desirable feature of an AR/VR device is to provide high resolution. Although this imposes a limit on the depth of focus, this limitation, common in optical systems used to capture complex scenery, is less stringent for an external display disclosed herein because the depth of field is limited by the relative location between the external display and the user's face, which varies little.

Embodiments as disclosed herein improve the quality of in-person interaction using VR headsets for a wide variety of applications wherein one or more people wearing a VR headset interact with one or more people not wearing a VR headset. Embodiments as discussed herein remove the friction between VR users and onlookers or other VR users, and bridge the gap between VR and AR: co-presence benefits of see-through AR with more finesse and higher immersion capacity of VR systems. Accordingly, embodiments as disclosed herein provide a compelling and more natural VR experience.

More generally, embodiments as disclosed herein provide an AR/VR headset that looks like a standard pair of see-through glasses to the onlooker, enabling a better engagement of the AR/VR user with the surrounding environment. This is highly helpful in scenarios where AR/VR users interact with other people or onlookers.

FIG. 1A illustrates a headset 10A including autostereo-scopic external displays 110A, according to some embodiments. Headset 10A may be an AR or VR device configured to be mounted on a user's head. Headset 10A includes two eyepieces 100A mechanically coupled by a strap 15 and having a flexible mount to hold electronics components 20 in the back of the user's head. A flex connector 5 may electronically couple eyepieces 100A with electronic component 20. Each of eyepieces 100A include eye imaging systems 115-1 and 115-2 (hereinafter, collectively referred to as "eye imaging systems 115"), configured to collect an image of a portion of a face of the user reflected from an optical surface in a selected field of view (FOV). Eye imaging systems 115 may include dual eye cameras that collect two images of the eye of the user at different FOVs, so as to generate a three-dimensional, stereoscopic view of at least a portion of the user's face. Eye imaging systems 115 may provide information about pupil location and movement to the electronics components. Eyepieces 100A may also include external displays 110A (e.g., a light field display) adjacent to the optical surface and configured to project an autostereoscopic image of the face of the user forward from the user.

In some embodiments, electronics components 20 may include a memory circuit 112 storing instructions and a processor circuit 122 that executes the instructions to receive the image of the portion of the face of the user from eye imaging systems 115, and provide to external displays 110A the autostereoscopic image of the face of the user. Moreover, electronics components 20 may also receive the image from the portion of the user's face from the one or more eye cameras, and apply image analysis to assess gaze, vergence, and focus by the user on an aspect of the exterior view, or a virtual reality display. In some embodiments, electronics components 20 include a communications module 118 configured to communicate with a network. Communications module 118 may include radio-frequency software and hardware to wirelessly communicate memory 112 and processor 122 with an external network, or some other device. Accordingly, communications module 118 may include radio antennas, transceivers, and sensors, and also digital processing circuits for signal processing according to any one of multiple wireless protocols such as Wi-Fi, Bluetooth, Near field contact (NFC), and the like. In addition, communications module 118 may also communicate with other input tools and accessories cooperating with headset 10A (e.g., handle sticks, joysticks, mouse, wireless pointers, and the like).

In some embodiments, eyepieces 100A may include one or more exterior cameras 125-1 and 125-2 (hereinafter, collectively referred to as "exterior cameras 125") to capture a front view of a scene for the user. In some embodiments, exterior cameras 125 may focus or be directed to (e.g., by processor 122) aspects of the front view that the user may be particularly interested in, based on the gaze, vergence, and other features of the user's view that may be derived from the image of the portion of the user's face provided by the dual eye camera.

Figure 1B:
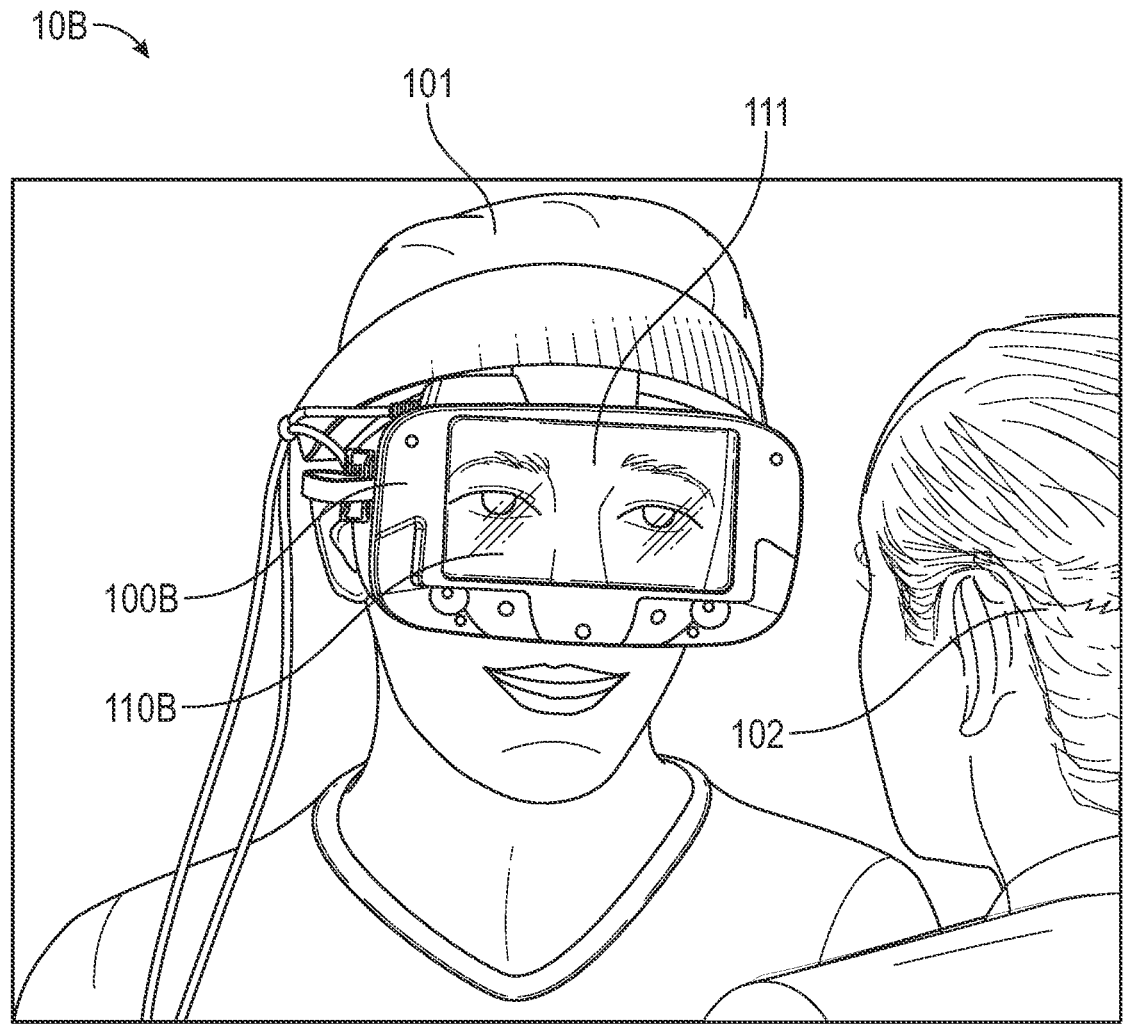
FIG. 1B illustrates a user of an AR or VR device as viewed by a forward onlooker, according to some embodiments.

FIG. 1B illustrates a headset 10B as viewed by a forward onlooker, according to some embodiments. In some embodiments, headset 10B may be an AR or VR device in a "snorkel" configuration. Hereinafter, headsets 10A and 10B will be collectively referred to as "headsets 10." In some embodiments, a visor 100B may include a single forward display 110B that provides a view of user 101 to an onlooker 102. Display 110B includes a portion of the face having the two eyes, a portion of the nose, eyebrows, and other facial features of user 101. Further, an autostereoscopic image 111 of the user's face may include details such as an accurate and real-time position of the user's eyes, indicating a gaze direction and a vergence or focus of attention of user 101. This may indicate to onlooker 102 whether the user is paying attention to something that has been said, or some other environmental disturbance or sensorial input that may draw the user's attention.

In some embodiments, autostereoscopic image 111 offers a 3D rendering of the face of the user. Accordingly, onlooker 102 has a full body view of the user's face and even the user's head, changing perspective as onlooker 102 changes an angle of view. In some embodiments, the outwardly projected display 110B may include image features additional to the image of a portion of the user's face. For example, in some embodiments, the outwardly projected display may include virtual elements in the image superimposed to the image of the user's face (e.g., a reflection or glare of the virtual image that the user is actually viewing, or of a real light source in the environment).

Figure 2:
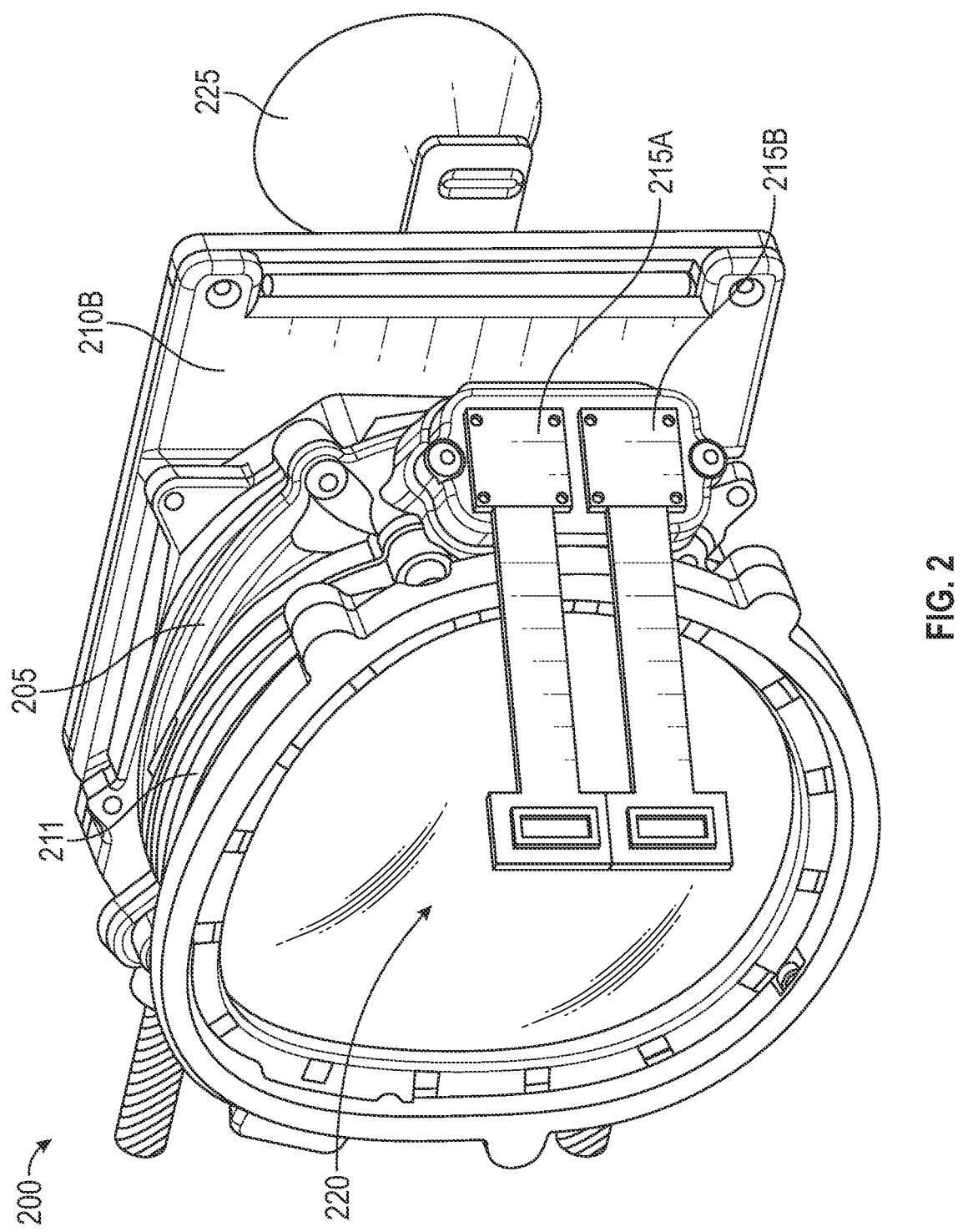
FIG. 2 illustrates a detailed view of an eyepiece for an AR or VR device configured to provide a reverse pass-through view of the user's face to a forward onlooker, according to some embodiments.

FIG. 2 illustrates a detailed view of an eyepiece 200 for an AR or VR device configured to provide a reverse pass-through view of the user's face to a forward onlooker (cf eyepieces 100A and snorkel visor 100B), according to some embodiments. Eyepiece 200 includes an optical surface 220 configured to provide an image to a user on a first side (to the left) of optical surface 220. In some embodiments, the image to the user may be provided by a forward camera 225, and optical surface 220 may include a display coupled to forward camera 225. In some embodiments, the image in optical surface 220 may be a virtual image provided by a processor executing instructions stored in a memory (e.g., for VR devices, memory 112 and processor 122). In some embodiments (e.g., for AR devices), the image to the user may include, at least partially, an image transmitted from the front side of eyepiece 200 via transparent optical components (e.g., lenses, waveguides, prisms, and the like).

In some embodiments, eyepiece 200 also includes a first eye camera 215A and a second eye camera 215B (hereinafter, collectively referred to as "eye cameras 215") configured to collect first and second images of the user's face (e.g., the eye of the user) at two different FOVs. In some embodiments, eye cameras 215 may be infrared cameras collecting images of the user's face in reflection mode, from a hot mirror assembly 205. An illumination ring 211 may provide illumination to the portion of the user's face that is going to be imaged by eye cameras 215. Accordingly, optical surface 220 may be configured to be reflective at the wavelength of light operated by eye cameras 215 (e.g., the infrared domain), and transmissive of light providing an image to the user, e.g., the visible domain, including Red (R), Blue (B), and Green (G) pixels. A forward display 210B projects an autostereoscopic image of the face of the user to an onlooker (to the right end of the figure).

FIGS. 3A-3D illustrate different aspects and components of a micro lens array 300 used as a screen to provide a reverse pass-through view of a user in an AR or a VR device to a forward onlooker, according to some embodiments. In some embodiments, micro lens array 300 receives light from a pixel array 320 and provides the image of the face of the user to the onlooker. In some embodiments, the image of the face of the user is a perspective view of a 3D rendition of the face of the user, depending on the onlooker angle of view.

FIG. 3A is a detailed view of micro lens array 300 and includes multiple micro lenses 301-1, 301-2, and 301-3 (collectively referred to, hereinafter, as "micro lenses 301") arranged in a two-dimensional pattern 302 having a pitch 305. In some embodiments, an aperture mask 315 may be disposed adjacent to the micro lens array such that one aperture is aligned with each micro lens 301, to avoid cross-talk of different angles of view from the point of view of the onlooker.

For illustrative purposes only, pattern 302 is a hexagonal lattice of micro lenses 301 having a pitch 305 of less than a millimeter (e.g., 500 μm). Micro lens array 300 may include a first surface and a second surface 310 including concavities forming micro lenses 301, the first and second surfaces 310 separated by a transmissive substrate 307 (e.g., N-BK7 glass, plastic, and the like). In some embodiments, transmissive substrate 307 may have a thickness of about 200 μm.

Figure 3B:
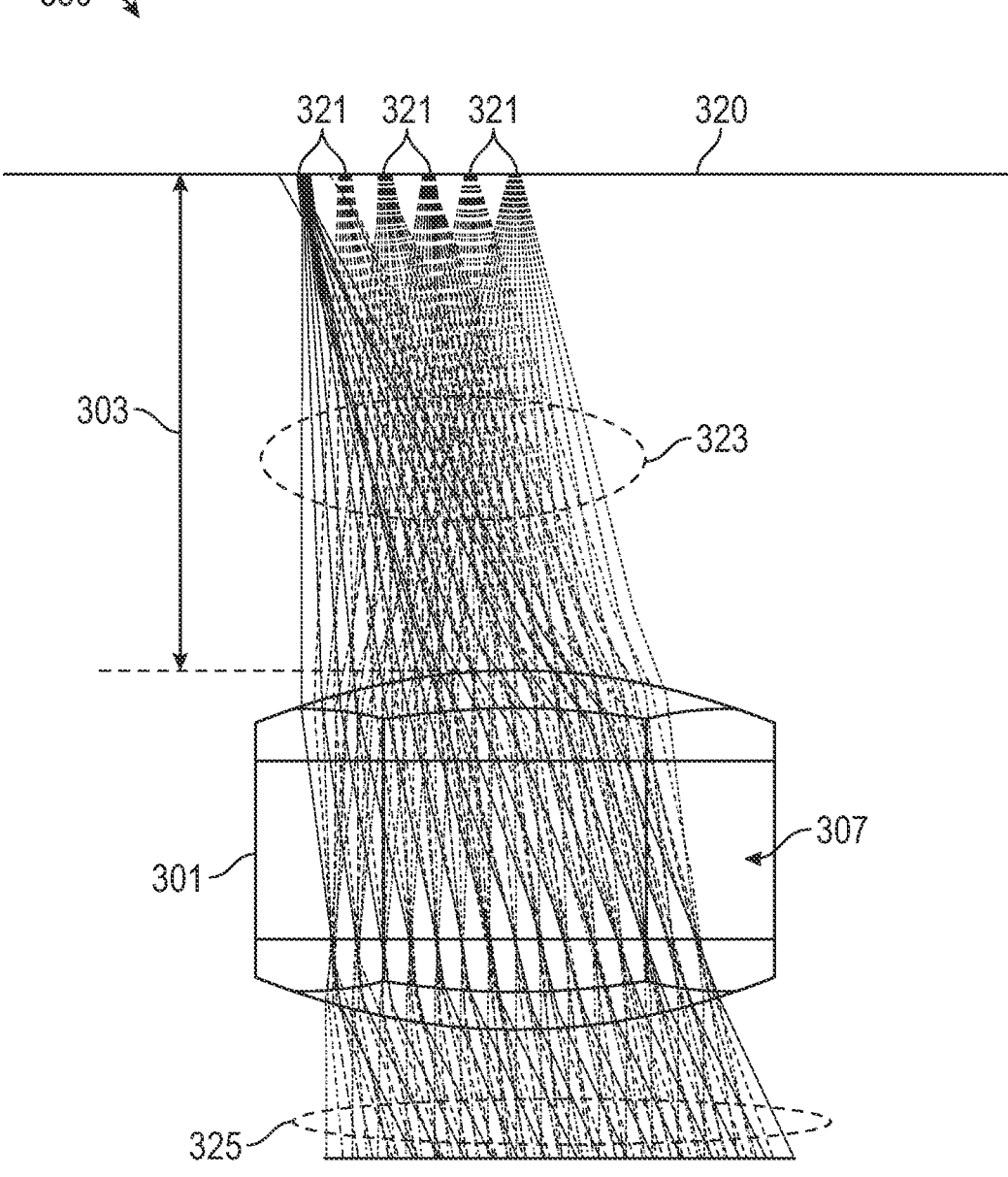

FIG. 3B is a detailed view of a light field display 350 for use in a reverse pass-through headset, according to some embodiments. Light field display 350 includes a pixel array 320 adjacent to a micro lens array (e.g., micro lens array 300), of which only a micro lens 301 is shown, for illustrative purposes. Pixel array 320 includes multiple pixels 321 generating light beams 323 directed to micro lens 301. In some embodiments, a distance 303 between pixel array 320 and micro lens 301 may be approximately equal to the focal length of micro lens 301, and therefore outgoing light beams 325 may be collimated in different directions, depending on the specific position of the originating pixel 321. Accordingly, different pixels 321 in pixel array 320 may provide a different angle of view of a 3D representation of the user's face, depending on the location of the onlooker.

Figure 3C:
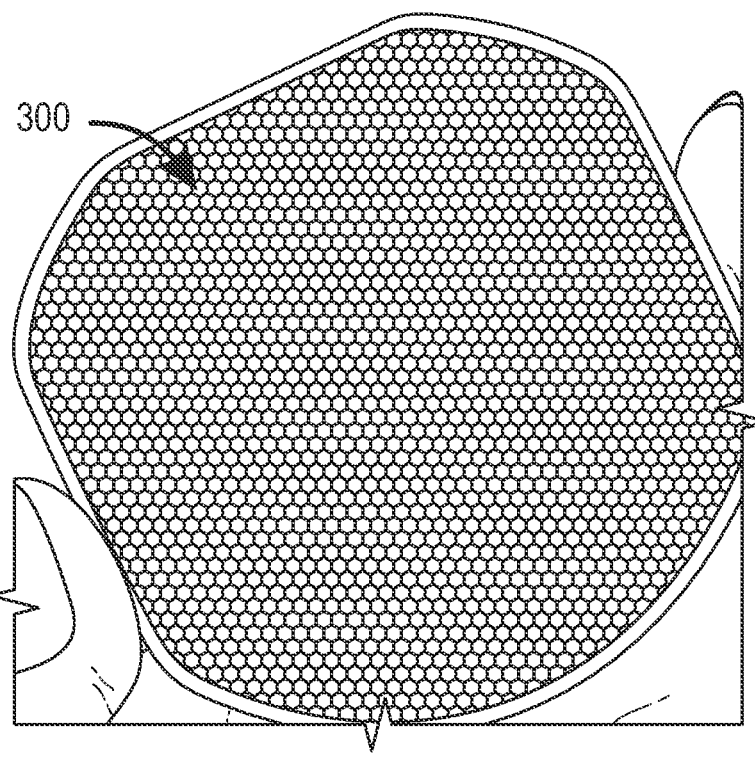

FIG. 3C is a plan view of micro lens array 300, showing a honeycomb pattern.

Figure 3D:
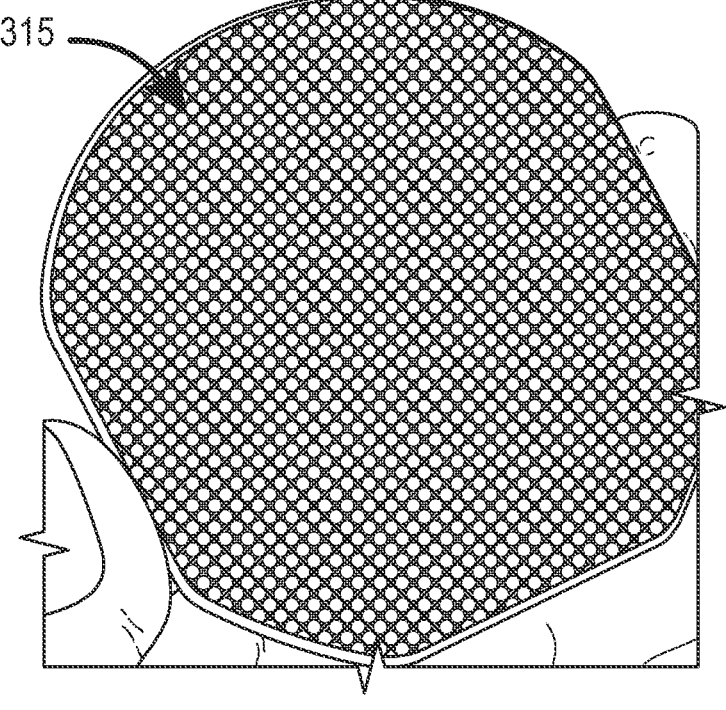

FIG. 3D illustrates micro lens array 300 with aperture mask 315 disposed adjacent to it so that openings on aperture mask 315 are centered on micro lens array 300. In some embodiments, aperture mask 315 may include chrome, having apertures of about 400 μm over a 500 μm hex-pack pitch (as illustrated). Aperture mask 315 may be lined up with the first surface or the second surface 310, on either side of micro lens array 300, or on both sides.

Figure 4:
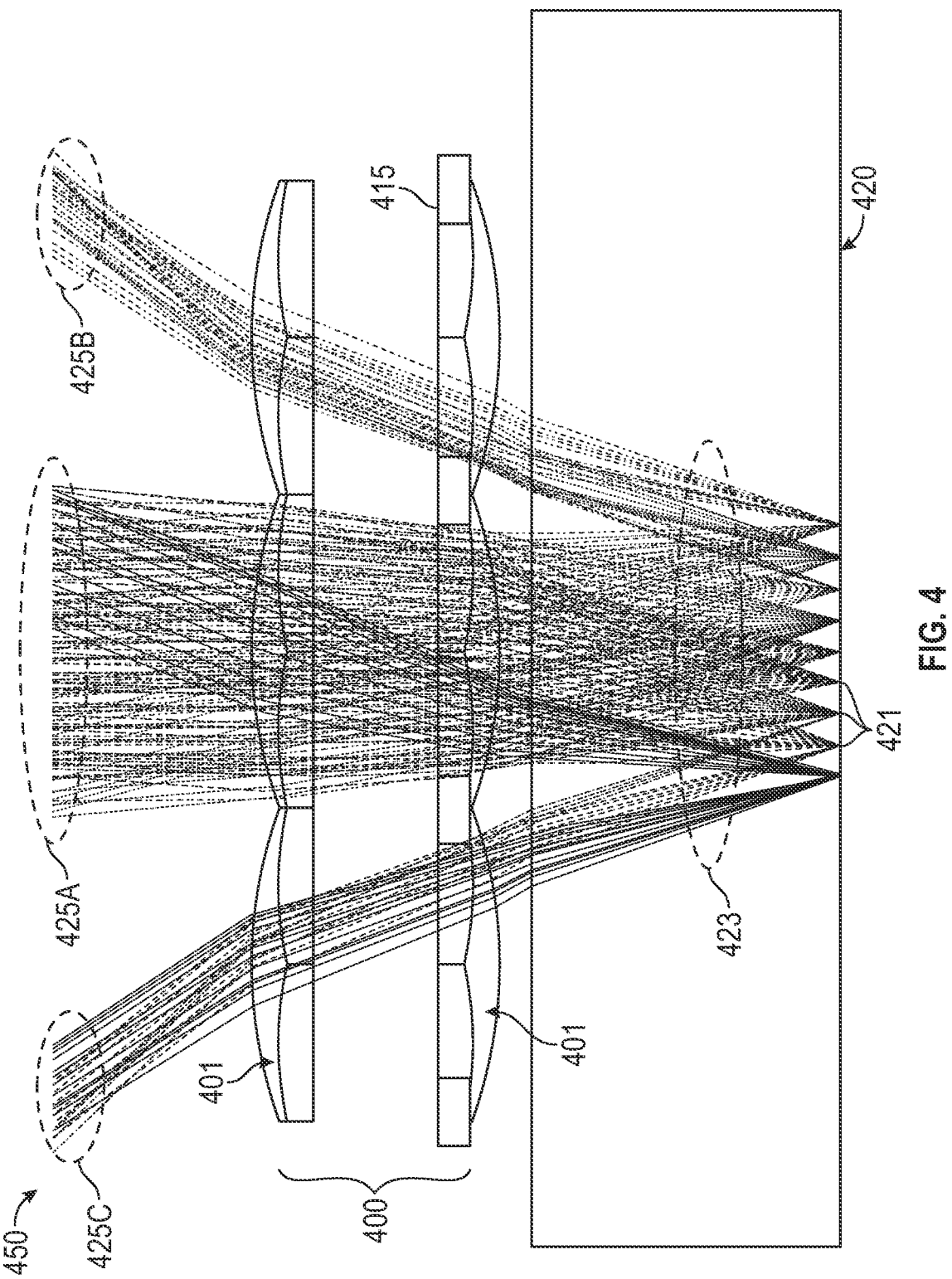
FIG. 4 illustrates a ray-tracing view through a light field display to provide a wide-angle, high resolution view of an AR or a VR device user to a forward onlooker, according to some embodiments.

FIG. 4 illustrates a ray-tracing view of a light field display 450 to provide a reverse pass-through image of the face of a user of an AR/VR device to an onlooker, according to some embodiments. Light field display 450 includes a micro lens array 400 used to provide a wide-angle, high resolution view of the face of a user of an AR or a VR device, to a forward onlooker, according to some embodiments. Micro-lens array 400 includes multiple micro-lenses 401 arranged in a two dimensional pattern, as disclosed herein. A pixel array 420 may include multiple pixels 421 providing light rays 423 that are transmitted through micro lens array 400 to generate a 3D rendition of at least a portion of a face of the user of the AR or VR device. Micro lens array 400 may include aperture mask 415. Aperture mask 415 provides blocking elements near the edges of each of the micro lenses in micro lens array 400. The blocking elements reduce the amount of light rays 425B and 425C relative to light rays 425A forming the front view of the user's face, for the onlooker. This reduces cross talk and ghosting effects for an onlooker situated in front of the screen and looking at the 3D rendition of the user's face (down, according to FIG. 4).

Figure 5A:
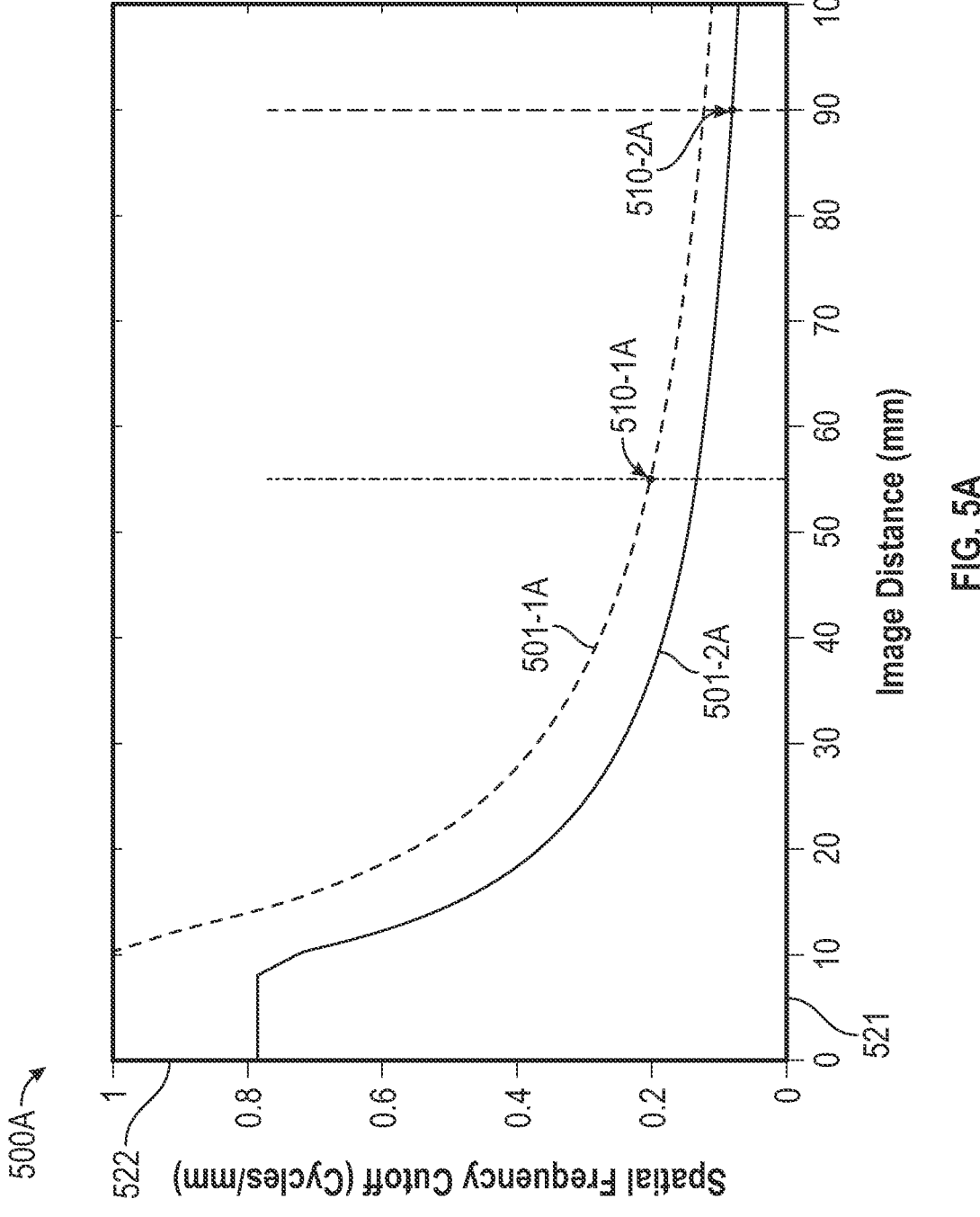
FIGS. 5A-5D illustrate different aspects of a resolution power characteristic in a micro lens array used to provide a wide-angle, high resolution view of an AR or a VR device user, according to some embodiments.
Figure 5B:
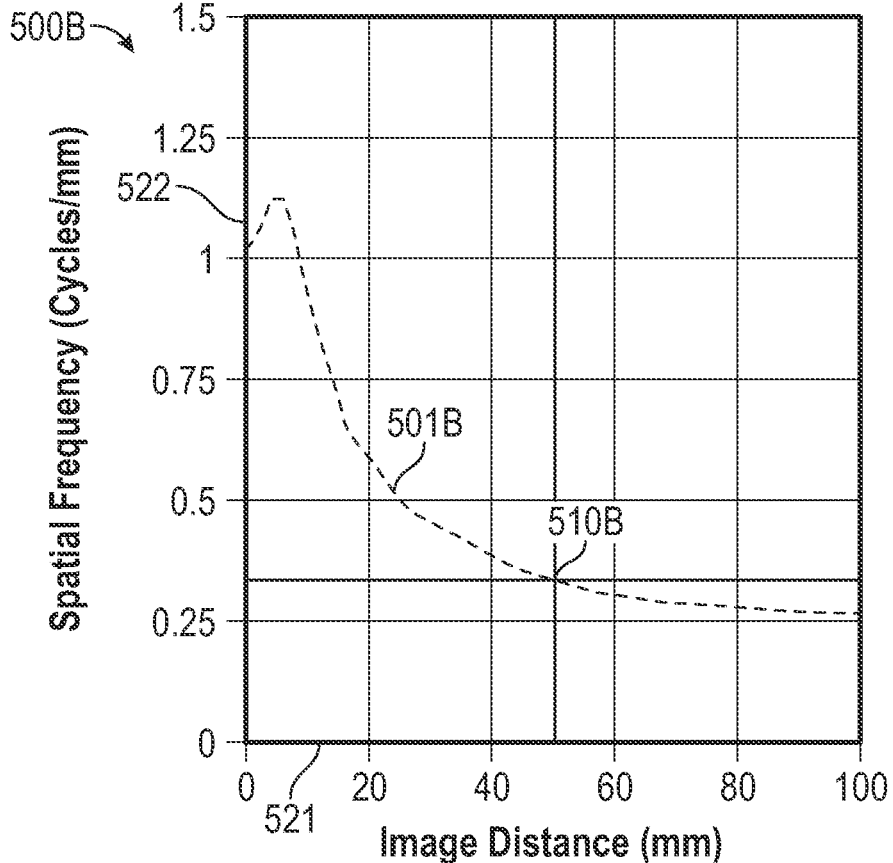
Figure 5C:
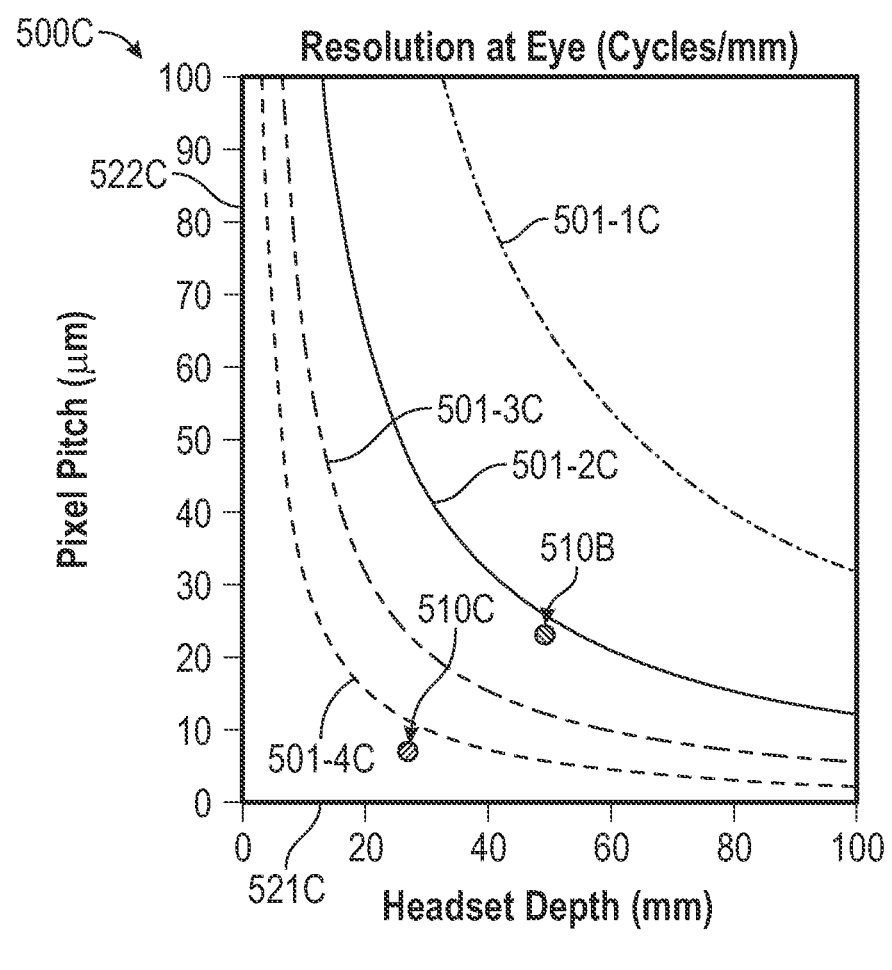

FIGS. 5A-5C illustrate different aspects of a resolution power characteristic 500A, 500B, and 500C (hereinafter, collectively referred to as "resolution power characteristics 500") in a micro lens array to provide a wide-angle, high resolution view of the face of a user of an AR or a VR device, according to some embodiments. The abscissae 521 (X-axis), in resolution power characteristics 500 indicates an image distance (in mm) between the user's face (e.g., the eye of the user) and the micro lens array. The ordinates 522 (Y-axis), in resolution power characteristics 500 is the resolution of the optical system including the light display and the screen given in terms of a frequency value, e.g., feature cycles on the display, per millimeter (cycles/mm), as viewed by an onlooker situated about a meter away from the user wearing the AR or VR device.

FIG. 5A illustrates resolution power characteristic 500A including a cutoff value, which is the highest frequency that the onlooker may distinguish from the display. Curves 501-1A and 501-2A (hereinafter, collectively referred to as "curves 501A") are associated with two different headset models (referred to as Model 1 and Model 2, respectively). The specific resolution depends on the image distance and other parameters of the screen, such as the pitch of the micro lens array (e.g., pitch 305). In general, for a larger distance between the eye of the user and the screen, the resolution cutoff will monotonically decrease (to the right along abscissae 521). This is illustrated by the difference in cutoff values 510-2A (approx. 0.1 cycles/mm) for curve 501-2A, and 510-1A (approx. 0.25 cycles/mm) for curve 501-1A. Indeed, the headset model for curve 501-2A has a larger image distance (close to 10 cm between user face and display) than the headset model for curve 501-1A (about 5 cm between user eyes and display). Also, for a micro lens array having a wider pitch (Model 2, 500 μm pitch), the resolution cutoff will be reduced relative to a smaller pitch (Model 1,200 μm pitch).

FIG. 5B illustrates resolution power characteristic 500B including a curve 501B for a light field display model (Model 3) providing a spatial frequency of about 0.3 cycles/mm with an image distance of about 5 cm at point 510B.

FIG. 5C illustrates resolution power characteristic 500C including curves 501-1C, 501-2C, 501-3C, and 501-4C (hereinafter, collectively referred to as "curves 501C"). The abscissae 521C (X-axis) for resolution power characteristics 500C indicates a headset depth (e.g., similar to a distance between the user's eyes/face and the light field display), and the ordinates 522C (Y-axis) indicate a pixel pitch (in microns, μm) for the pixel array in the light field display. Each one of curves 501C indicates a number of cycles/mm cutoff resolution for each light field display model. Point 510B is illustrated in comparison with a better resolution obtained at point 510C for a light field display model (Model 4) with high density pixel packing (less than 10 μm pitch), and a close headset depth of about 25 mm (e.g., about one inch or less).

Figure 5D:
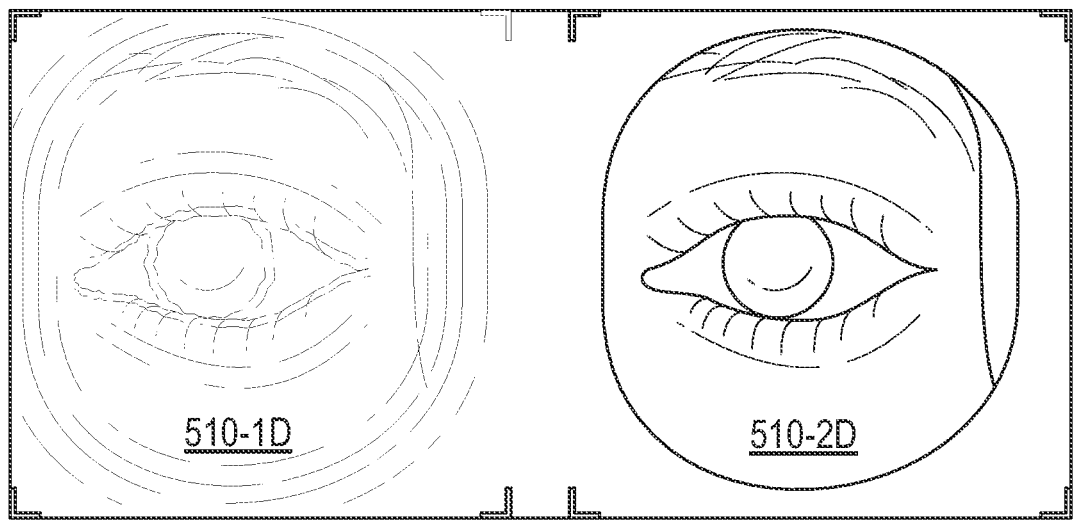

FIG. 5D illustrates images 510-1D and 510-2D of the user wearing the headset according to an onlooker, for each of light field display models. Image 510-1D is obtained with Model 3, and image 510-2D is obtained with Model 4, of the light field display (cf points 510B and 510C, respectively). The resolution performance of Model 4 is certainly better than that of Model 3, indicating that there is a wide range of possibilities to accommodate a desired resolution in view of other trade-offs in terms of model design, consistent with the present disclosure.

Figure 6:
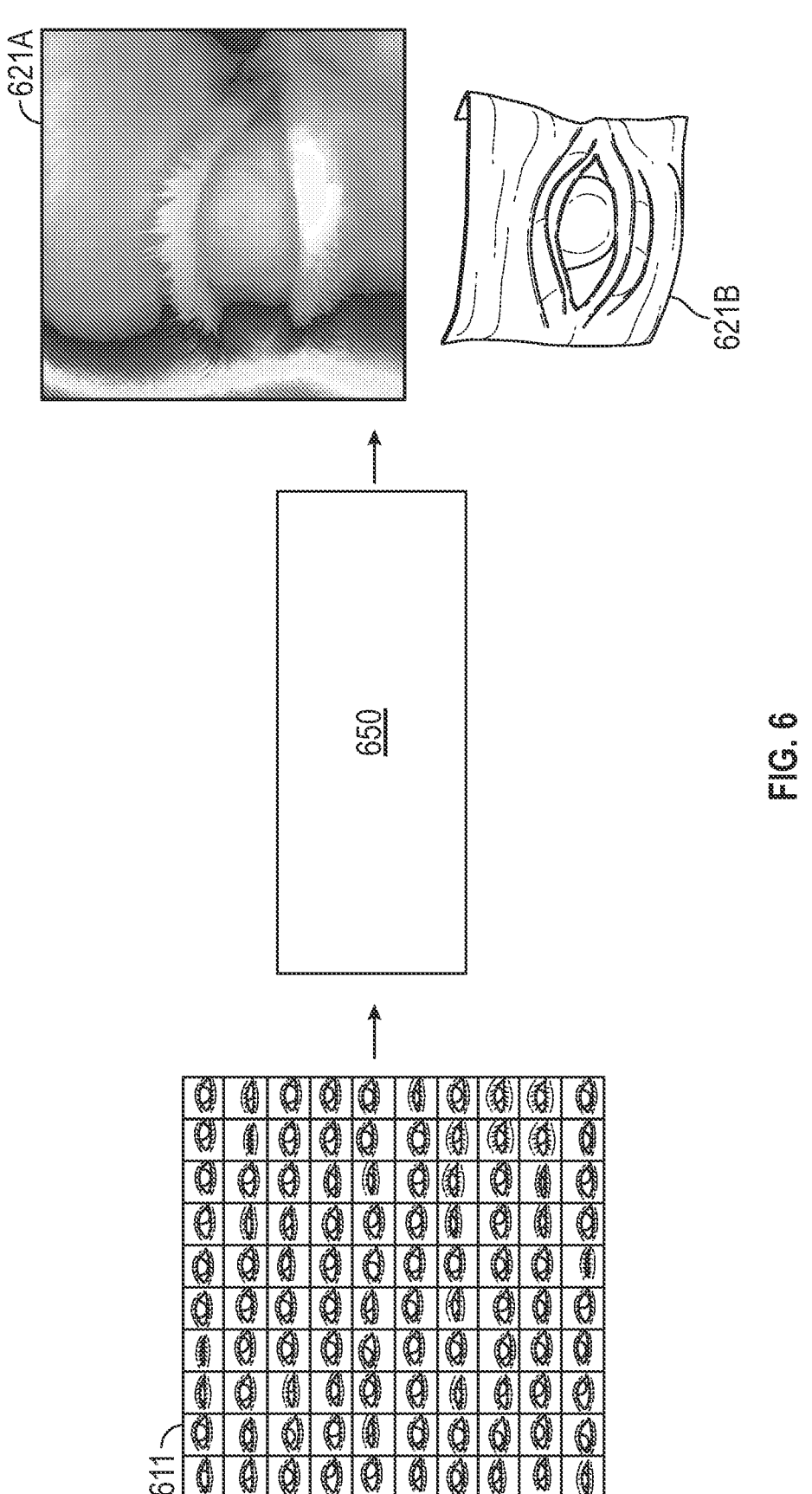
FIG. 6 illustrates a 3D rendition of a portion of a face of an AR or VR device user, according to some embodiments.

FIG. 6 illustrates a 3D rendition 621A and 621B (hereinafter, collectively referred to as "3D rendition 621") of a portion of a face of a user of an AR or VR device, according to some embodiments. In some embodiments, 3D rendition 621 is provided by a model 650 operating on multiple 2D images 611 of at least a portion of the user's face (e.g., the eyes), and provided by an eye imaging system in the AR or VR device (cf eye imaging system 115 and eye cameras 215). Model 650 may include linear and/or nonlinear algorithms such as neural networks (NN), convolutional neural networks (CNN), machine learning (ML) models, and artificial intelligence (AI) models. Model 650 includes instructions stored in a memory circuit and executed by a processor circuit. The memory circuit and the processor circuit may be stored in the back of the AR or VR device (e.g., memory 112 and processor 122 in electronics components 20). Accordingly, multiple 2D images 611 are received from the eye imaging system to create, update, and improve model 650. The multiple 2D images include at least two different FOVs, e.g., coming from each of two different stereoscopic eye cameras in the eye imaging system, and model 650 can determine which image came from which camera, to form 3D rendition 621. Model 650 then uses the 2D image input and detailed knowledge of the difference between the FOVs of the two eye cameras (e.g., a camera direction vector) to provide 3D rendition 621 of at least a portion of the face of the user of the AR or VR device.

Figure 7:
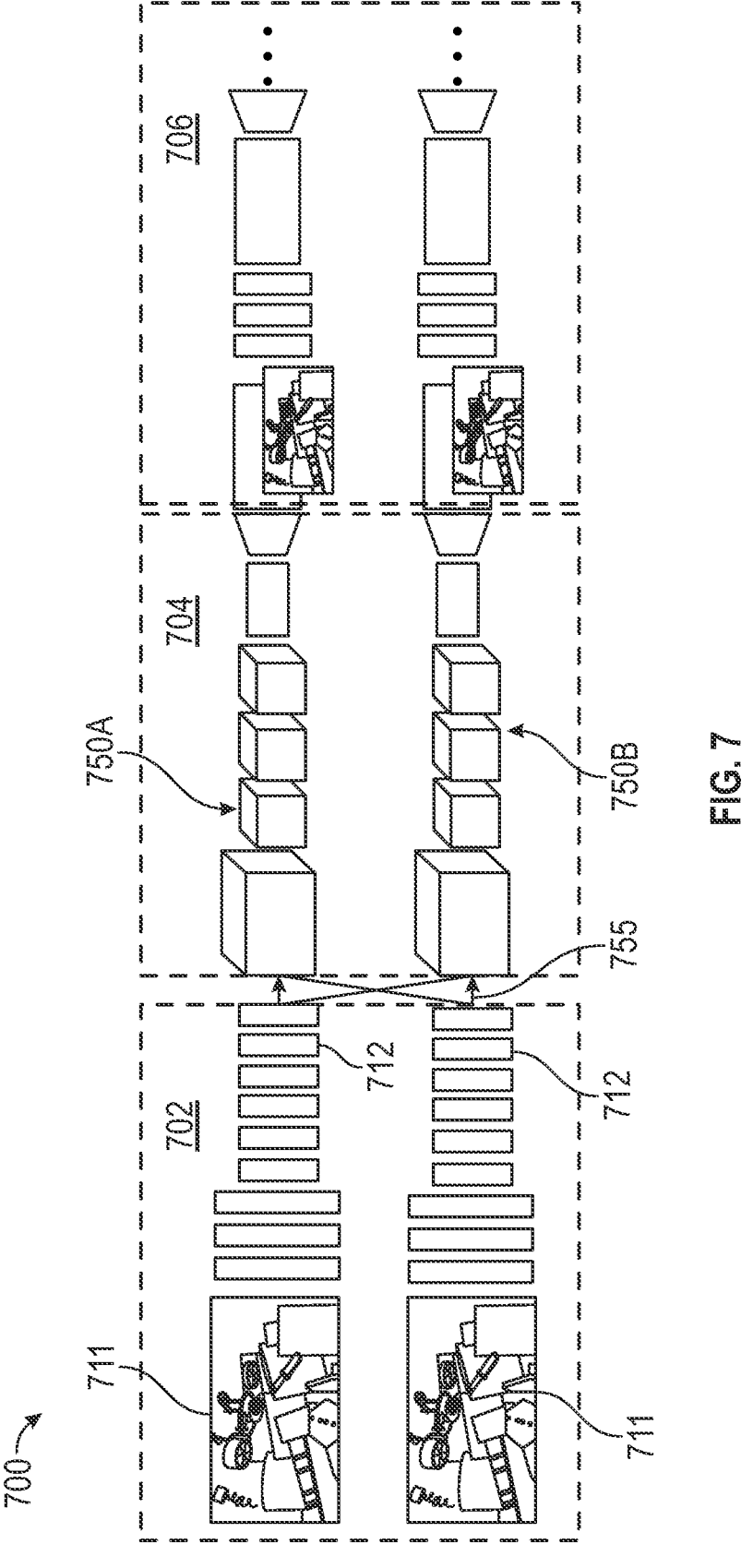
FIG. 7 illustrates a block diagram of a model architecture used for a 3D rendition of a portion of a face of a VR/AR headset user, according to some embodiments.

FIG. 7 illustrates a block diagram of a model architecture 700 used for a 3D rendition of a portion of a face of a user of a VR/AR headset, according to some embodiments. Model architecture 700 is split into two tracks 750A and 750B (hereinafter, collectively referred to as "tracks 750"), each for a different camera view of the user's face. The two tracks 750 are then combined by sharing weights in the model 755. Model architecture 700 may include several stages, as follows:

Stage 702: Extract image features (e.g., in 2D) at a lower resolution (e.g., with an infrared camera) using a Siamese network. In some embodiments, stage 702 includes downsampling 712 the feature set over several neural network layers, for a set of input images 711 (e.g., training images or sampling images).

Stage 704: Build a cost volume at the lower resolution by matching the features along scan lines in the images, to provide a coarse disparity estimate.

Stage 706: Refine the results hierarchically to recover small details and thin structures.

FIGS. 8A-8D illustrate elements and steps in a method for training a model to provide a view of a portion of a user's face to an autostereoscopic display in a virtual reality headset, according to some embodiments. An eyepiece 800 is trained with multiple training images 811 from multiple users. A 3D model 821 for each of the users is created including a texture map and a depth map to recover fine details of the image features 833-1B, 833-2B, and 833C (hereinafter, collectively referred to as "texture and depth maps 833"). When 3D model 821 is generated, an autostereoscopic image of the three-dimensional reconstruction of the user's face is provided to a pixel array in a light field display. The light field display is separated into multiple segments of active pixels, each segment providing a portion of a field of view of 3D model 821 in a selected angle of view for the onlooker.

Figure 8A:
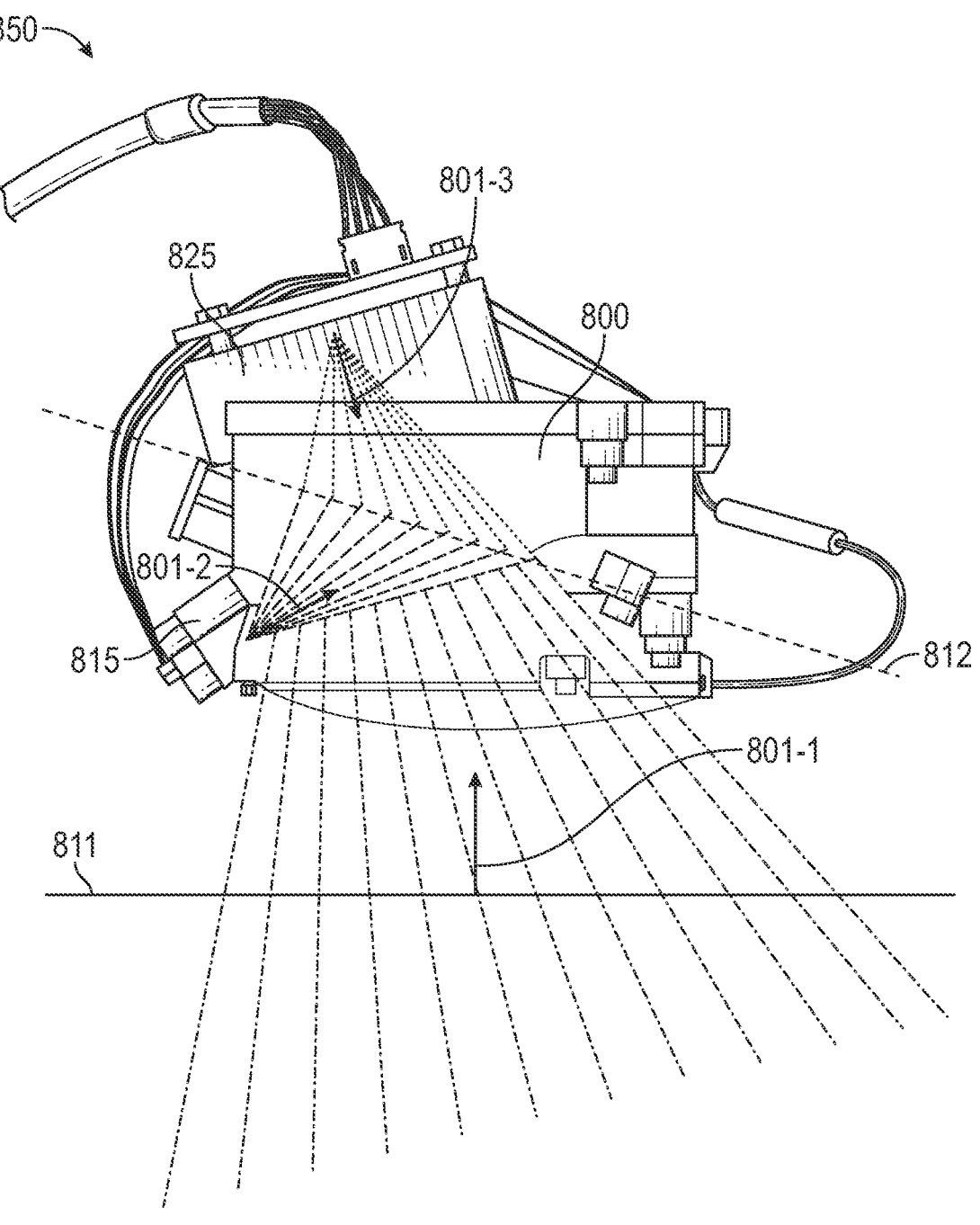

FIG. 8A illustrates a setup 850 for collecting multiple training images 811 onto eyepiece 800, according to some embodiments. Training images 811 may be provided by a display, and projected onto a screen 812 disposed at the same location as the hot mirror will be when the eyepiece is assembled in the headset. One or more infrared cameras 815 collect training images 811 in reflection mode, and one or more RGB cameras 825 collect training images in transmission mode. Setup 850 has an image vector 801-1, an IR camera vector 801-2, and an RGB camera vector 801-3 (hereinafter, collectively referred to as "positioning vectors 801"), fixed for all training images 811. Positioning vectors 801 are used by the algorithm models to accurately assess sizes, distances, and angles of view associated with 3D model 821.

FIG. 8B illustrates texture and depth images 833-1B and 833-2B, according to some embodiments. Texture image 833-1B may be obtained from a capture of a training image using RGB camera 825, and depth image 833-2B may be obtained from a training image using IR camera 815.

Figure 8C:
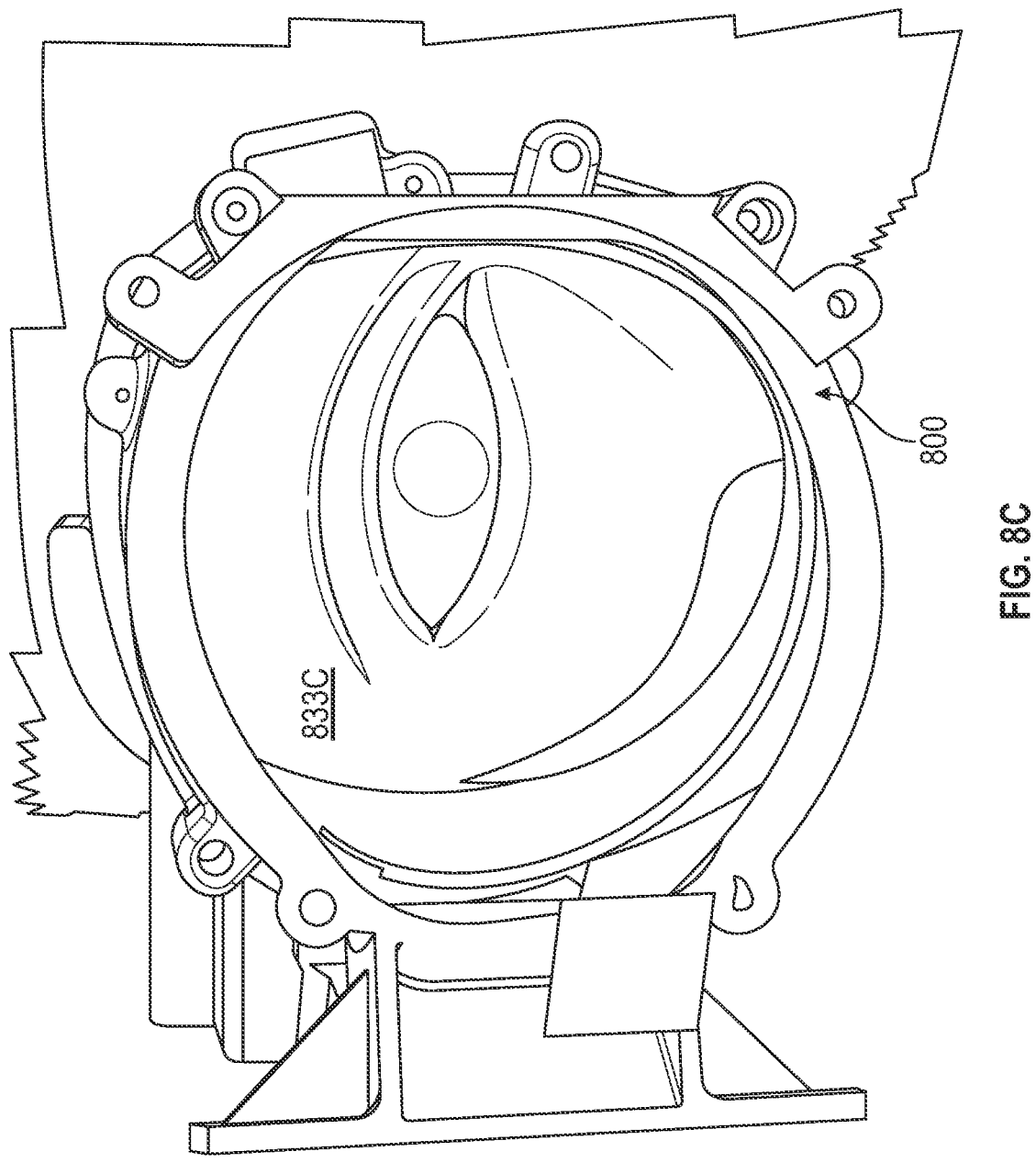

FIG. 8C illustrates a depth image 833C collected with IR camera 815, according to some embodiments.

Figure 8D:
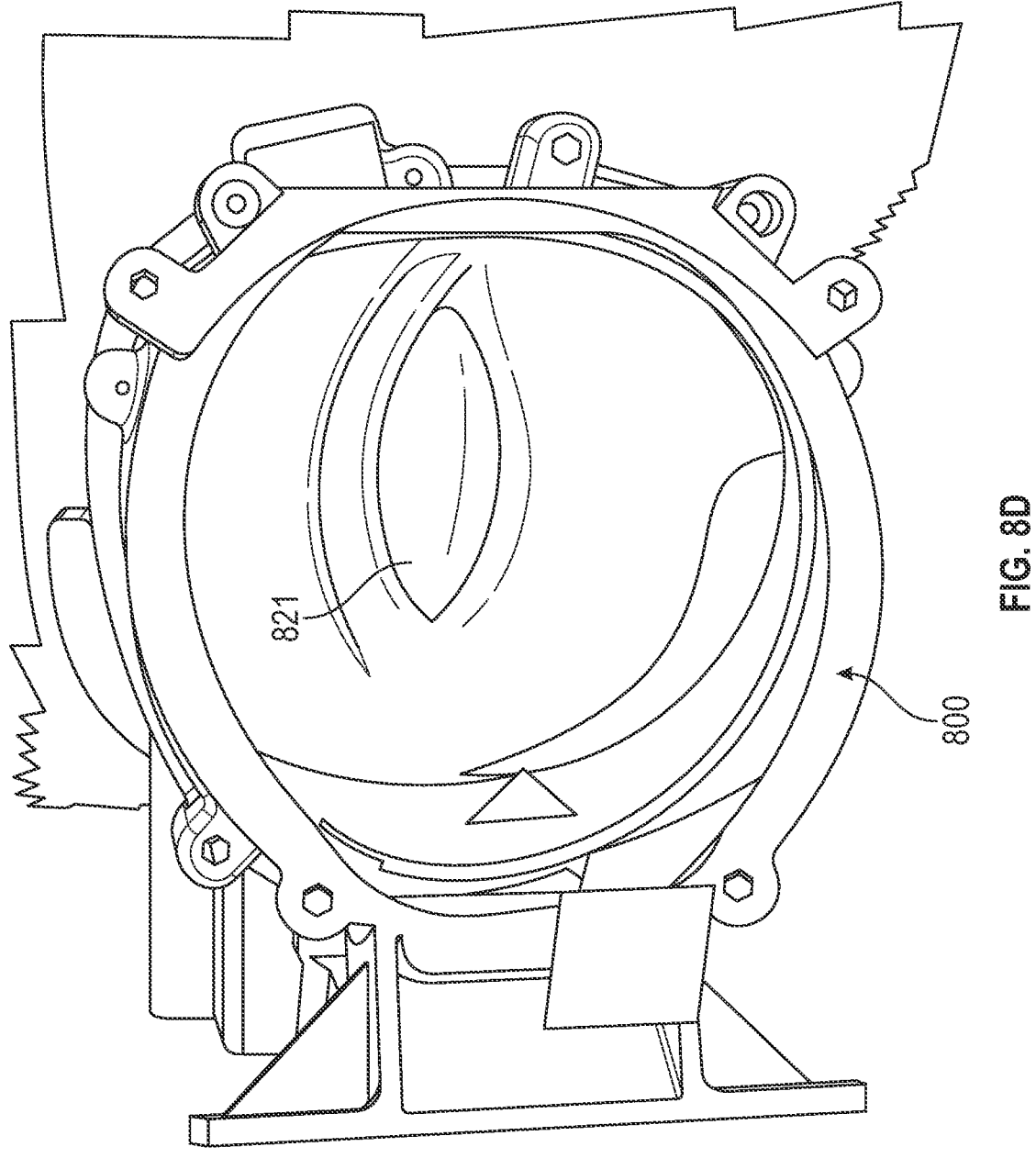

FIG. 8D illustrates 3D model 821 formed in relation to eyepiece 800, according to some embodiments.

FIG. 9 illustrates a flowchart in a method 900 for providing an autostereoscopic view of a face of a VR/AR headset user, according to some embodiments. Steps in method 900 may be performed at least partially by a processor executing instructions stored in a memory, wherein the processor and the memory are part of electronics components in a headset as disclosed herein (e.g., memory 112, processor 122, electronics components 20, and headsets 10). In yet other embodiments, at least one or more of the steps in a method consistent with method 900 may be performed by a processor executing instructions stored in a memory wherein at least one of the processor and the memory are remotely located in a cloud server, and the headset device is communicatively coupled to the cloud server via a communications module coupled to a network (cf communications module 118). In some embodiments, method 900 may be performed using a model including a neural network architecture in a machine learning or artificial intelligence algorithm, as disclosed herein (e.g., model 650, model architecture 700). In some embodiments, methods consistent with the present disclosure may include at least one or more steps from method 900 performed in a different order, simultaneously, quasi-simultaneously, or overlapping in time.

Step 902 includes receiving multiple two-dimensional images having one or more fields of view from a portion of a user's face.

Step 904 includes extracting multiple image features from the two-dimensional images at a first resolution setting. In some embodiments, step 904 includes matching the image features along a scan line to build a cost volume at a first resolution setting and to provide a coarse disparity estimate. In some embodiments, step 904 includes recovering one or more image features including small details and thin structures at a second resolution setting that is higher than the first resolution setting. In some embodiments, step 904 includes generating a texture map of the portion of the user's face and a depth map of the portion of the user's face based on the image features, wherein the texture map includes a color detail of the image features and the depth map includes a depth location of the image features.

Step 906 includes rendering, for a portion of the user's face, a three-dimensional reconstruction based on the image features, wherein the portion of the user's face is obscured to an onlooker.

Step 908 includes providing, to the onlooker, an autostereoscopic image of the three-dimensional reconstruction of the user's face. In some embodiments, step 908 includes providing, to one segment of a light field display, a portion of a field of view of the user's face at a selected viewpoint for the onlooker. In some embodiments, step 908 further includes tracking one or more onlookers to identify an angle of view and modify a light field display to optimize a field of view for each of the one or more onlookers.

FIG. 10 illustrates a flowchart in a method 1000 for rendering a three-dimensional (3D) view of a portion of a user's face from multiple, two-dimensional (2D) images of a portion of the user's face. Steps in method 1000 may be performed at least partially by a processor executing instructions stored in a memory, wherein the processor and the memory are part of electronics components in a headset as disclosed herein (e.g., memory 112, processor 122, electronics components 20, and headsets 10). In yet other embodiments, at least one or more of the steps in a method consistent with method 1000 may be performed by a processor executing instructions stored in a memory wherein at least one of the processor and the memory are remotely located in a cloud server, and the headset device is communicatively coupled to the cloud server via a communications module coupled to a network (cf communications module 118). In some embodiments, method 1000 may be performed using a model including a neural network architecture in a machine learning or artificial intelligence algorithm, as disclosed herein (e.g., model 650, model architecture 700). In some embodiments, methods consistent with the present disclosure may include at least one or more steps from method 1000 performed in a different order, simultaneously, quasi-simultaneously, or overlapping in time.

Step 1002 includes receiving multiple 2D images having at least two or more fields of view.

Step 1004 includes extracting image features from the 2D images at a first resolution setting.

Step 1006 includes matching the image features along a scan line, to build a cost volume at the first resolution setting and to provide a coarse disparity estimate.

Step 1008 includes recovering one or more image features including small details and thin structures at a second resolution setting that is higher than the first resolution setting.

FIG. 11 illustrates a flowchart in a method 1100 for training a model to render a three-dimensional (3D) view of a portion of a user's face from multiple, two-dimensional (2D) images of a portion of the user's face, according to some embodiments. Steps in method 1100 may be performed at least partially by a processor executing instructions stored in a memory, wherein the processor and the memory are part of electronics components in a headset as disclosed herein (e.g., memory 112, processor 122, electronics components 20, and headsets 10). In yet other embodiments, at least one or more of the steps in a method consistent with method 1100 may be performed by a processor executing instructions stored in a memory wherein at least one of the processor and the memory are remotely located in a cloud server, and the headset device is communicatively coupled to the cloud server via a communications module coupled to a network (cf communications module 118). In some embodiments, method 1100 may be performed using a model including a neural network architecture in a machine learning or artificial intelligence algorithm, as disclosed herein (e.g., model 650, model architecture 700). In some embodiments, methods consistent with the present disclosure may include at least one or more steps from method 1100 performed in a different order, simultaneously, quasi-simultaneously, or overlapping in time.

Step 1102 includes collecting, from a face of multiple users, multiple ground-truth images. In some embodiments, step 1102 includes collecting a color image and an infrared image from a color display from a portion of a user's face.

Step 1104 includes rectifying the ground-truth images with stored, calibrated stereoscopic pairs of images.

Step 1106 includes generating, with a three-dimensional face model, multiple synthetic views of the face of the users, wherein the synthetic views of the face of the users match a geometry of a face imaging camera in the virtual reality headset, and the three-dimensional face model is texture mapped with the ground-truth images. In some embodiments, step 1106 includes generating a texture map and a depth map for each of the ground-truth images, wherein the texture map includes a color, a transparency, and a reflectance, and the depth map includes a virtual depth location, of each pixel in the ground-truth images.

Step 1108 includes training the three-dimensional face model based on a difference between the ground-truth images and the synthetic views of the face of the users. In some embodiments, step 1108 includes adjusting a coefficient in the three-dimensional face model based on a loss value between the ground-truth images and the synthetic views of the face of the users.

Hardware Overview

Figure 12:
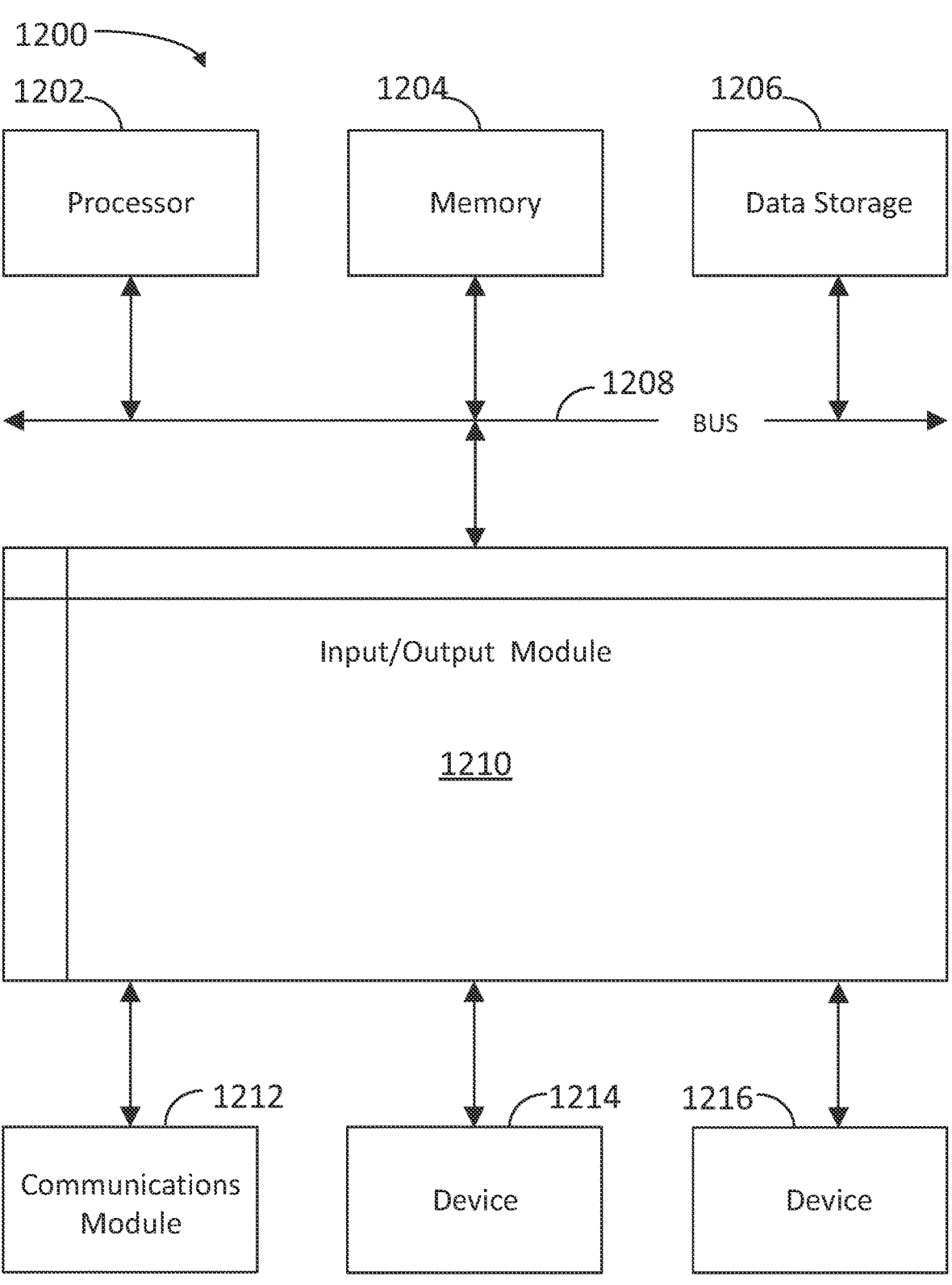
FIG. 12 illustrates a computer system configured to perform at least some of the methods for using an AR or VR device, according to some embodiments.

FIG. 12 is a block diagram illustrating an exemplary computer system 1200 with which headsets 10, and methods 900, 1000, and 1100 can be implemented. In certain aspects, computer system 1200 may be implemented using hardware or a combination of software and hardware, either in a dedicated server, or integrated into another entity, or distributed across multiple entities. Computer system 1200 may include a desktop computer, a laptop computer, a tablet, a phablet, a smartphone, a feature phone, a server computer, or otherwise. A server computer may be located remotely in a data center or be stored locally.

Computer system 1200 includes a bus 1208 or other communication mechanism for communicating information, and a processor 1202 (e.g., processor 122) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 112), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, e.g., one or more modules of computer program instructions encoded on a computer-readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled with bus 1208 for storing information and instructions. Computer system 1200 may be coupled via input/output module 1210 to various devices. Input/output module 1210 can be any input/output module. Exemplary input/output modules 1210 include data ports such as USB ports. The input/output module 1210 is configured to connect to a communications module 1212. Exemplary communications modules 1212 include networking interface cards, such as Ethernet cards and modems. In certain aspects, input/output module 1210 is configured to connect to a plurality of devices, such as an input device 1214 and/or an output device 1216. Exemplary input devices 1214 include a keyboard and a pointing device, e.g., a mouse or a trackball, by which a consumer can provide input to the computer system

1200. Other kinds of input devices 1214 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1216 include display devices, such as an LCD (liquid crystal display) monitor, for displaying information to the consumer.

According to one aspect of the present disclosure, headsets 10 can be implemented, at least partially, using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with pattern of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially described as such, one or more features from a described combination can in some cases be excised from the combination, and the described combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
receiving, from a first camera of a headset, a first image having a first field of view including a first eye of a subject, wherein the subject is a user of the headset;
receiving, from a second camera of the headset, a second image having a second field of view including a second eye of the subject;
generating a first image projection including information associated with the first field of view and the second field of view from a first angle of view, of an onlooker, relative to one or more first displays of the headset;
generating a second image projection including information associated with the first field of view and the second field of view from a second angle of view, of the onlooker, relative to one or more second displays of the headset; and
providing, for display on the one or more first or second displays of the headset, the first image projection or the second image projection.

2. The method of claim 1, wherein the first camera is an IR camera.

3. The method of claim 1, wherein the first image projection is based on a 3D rendition of a portion of the subject's face.

4. The method of claim 1, wherein the first image projection is generated using one or more models, comprising: a neural network, a convolutional neural network, a machine learning model, or artificial intelligence model.

5. The method of claim 1, wherein the first image projection or the second image projection is provided based on the onlooker changing from the first angle of view to the second angle of view.

6. The method of claim 1, further comprising:
tracking the onlooker; and
identifying, based on the tracking of the onlooker, the first angle of view of the onlooker.

7. The method of claim 1, further comprising:
assessing at least one of a gaze, a vergence, or a focus of the first eye in the first image;
wherein the generating the first image projection is based on the assessed at least one of the gaze, the vergence, or the focus of the first eye.

8. The method of claim 1, wherein at least one of the first image projection or the second image projection further includes one or more superimposed virtual elements.

9. The method of claim 1, wherein at least one of the one or more first displays of the headset is a light field display, and wherein the first image projection and the second image projection are autostereoscopic images.

10. The method of claim 1, wherein the one or more first displays of the headset are the one or more second displays of the headset.

11. A non-transitory computer-readable storage medium storing instructions that, when executed by a computing system, cause the computing system to:

receive, from a first camera of a headset, a first image having a first field of view including a first eye of a subject, wherein the subject is a user of the headset;

receive, from a second camera of the headset, a second image having a second field of view including a second eye of the subject;

generate a first image projection including information associated with the first field of view and the second field of view from a first angle of view, of an onlooker, relative to one or more first displays of the headset;

generate a second image projection including information associated with the first field of view and the second field of view from a second angle of view, of the onlooker, relative to one or more second displays of the headset; and provide, for display on the one or more first or second displays of the headset, the first image projection or the second image projection.

12. The non-transitory computer-readable storage medium of claim 11, wherein the first camera is an IR camera.

13. The non-transitory computer-readable storage medium of claim 11, wherein the first image projection is based on a 3D rendition of a portion of the subject's face.

14. The non-transitory computer-readable storage medium of claim 11, wherein at least one of the one or more first displays of the headset is a light field display, and wherein the first image projection and the second image projection are autostereoscopic images.

15. The non-transitory computer-readable storage medium of claim 11, wherein the one or more first displays of the headset are the one or more second displays of the headset.

16. A computing system comprising:

one or more processors; and one or more memories storing instructions that, when executed by the one or more processors, cause the computing system to:

receive, from a first camera of a headset, a first image having a first field of view including a first eye of a subject, wherein the subject is a user of the headset;

receive, from a second camera of the headset, a second image having a second field of view including a second eye of the subject;

generate a first image projection including information associated with the first field of view and the second field of view from a first angle of view, of an onlooker, relative to one or more first displays of the headset;

generate a second image projection including information associated with the first field of view and the second field of view from a second angle of view, of the onlooker, relative to one or more second displays of the headset; and provide, for display on the one or more first or second displays of the headset, the first image projection or the second image projection.

17. The computing system of claim 16, wherein the first camera is an IR camera.

18. The computing system of claim 16, wherein the first image projection is based on a 3D rendition of a portion of the subject's face.

19. The computing system of claim 16, wherein at least one of the one or more first displays of the headset is a light field display, and wherein the first image projection and the second image projection are autostereoscopic images.

20. The computing system of claim 16, wherein the one or more first displays of the headset are the one or more second displays of the headset.

* * * * *